(12) United States Patent
Sempuku et al.

(10) Patent No.: US 8,958,982 B2
(45) Date of Patent: Feb. 17, 2015

(54) NAVIGATION DEVICE

(75) Inventors: Tsuyoshi Sempuku, Tokyo (JP); Takeyuki Hori, Tokyo (JP); Sachiko Harada, Tokyo (JP); Yoko Sano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 84 days.

(21) Appl. No.: 13/702,806

(22) PCT Filed: Jun. 14, 2011

(86) PCT No.: PCT/JP2011/003375
§ 371 (c)(1),
(2), (4) Date: Dec. 7, 2012

(87) PCT Pub. No.: WO2011/158494
PCT Pub. Date: Dec. 22, 2011

(65) Prior Publication Data
US 2013/0096822 A1    Apr. 18, 2013

(30) Foreign Application Priority Data
Jun. 14, 2010   (JP) ................. 2010-134998

(51) Int. Cl.
| G06F 17/00 | (2006.01) |
| G06F 19/00 | (2011.01) |
| G01C 21/00 | (2006.01) |
| G01C 21/26 | (2006.01) |
| G01C 21/36 | (2006.01) |

(52) U.S. Cl.
CPC ........ *G01C 21/3629* (2013.01); *G01C 21/3644* (2013.01)
USPC ...... 701/409; 701/437; 701/300; 340/995.18; 340/995.2

(58) Field of Classification Search
USPC ......... 701/400, 408, 409, 410, 411, 424, 425, 701/426, 437, 438, 440, 467, 468, 300; 340/989, 990, 995.1, 995.14, 995.18, 340/995.19, 995.2, 995.23, 995.24
See application file for complete search history.

(56) References Cited

U.S. PATENT DOCUMENTS

| 7,873,468 B2 * | 1/2011 | Matsuura et al. ............. 701/428 |
| 2004/0186663 A1 | 9/2004 | Irie |

(Continued)

FOREIGN PATENT DOCUMENTS

| CN | 1532525 A | 9/2004 |
| CN | 1997874 A | 7/2007 |

(Continued)

*Primary Examiner* — Thomas Tarcza
*Assistant Examiner* — Edward Pipala
(74) *Attorney, Agent, or Firm* — Birch, Stewart, Kolasch & Birch, LLP

(57) ABSTRACT

Disclosed is a navigation device including: a target candidate extracting unit for extracting target candidates located along a guidance route from a map database on a basis of a vehicle position, the guidance route, and intersection information about a target intersection for guidance; a target determining unit for determining a target on a basis of knowledge about target determination from among the target candidates extracted by the target candidate extracting unit; a guidance sentence generating unit for generating a guidance sentence by using the target determined by the target determining unit; and a sound output unit for outputting voice guidance on a basis of the guidance sentence generated by the guidance sentence generating unit.

12 Claims, 18 Drawing Sheets

(56) References Cited

U.S. PATENT DOCUMENTS

2005/0261831 A1* 11/2005 Irie ............................. 701/211
2007/0233372 A1    10/2007 Matsunaga et al.
2008/0262714 A1* 10/2008 Abramovich Ettinger ... 701/201
2008/0262717 A1* 10/2008 Ettinger ....................... 701/206

FOREIGN PATENT DOCUMENTS

| | | |
|---|---|---|
| JP | 10-239078 A | 9/1998 |
| JP | 11-248477 A | 9/1999 |
| JP | 11-304528 A | 11/1999 |

\* cited by examiner

FIG.5
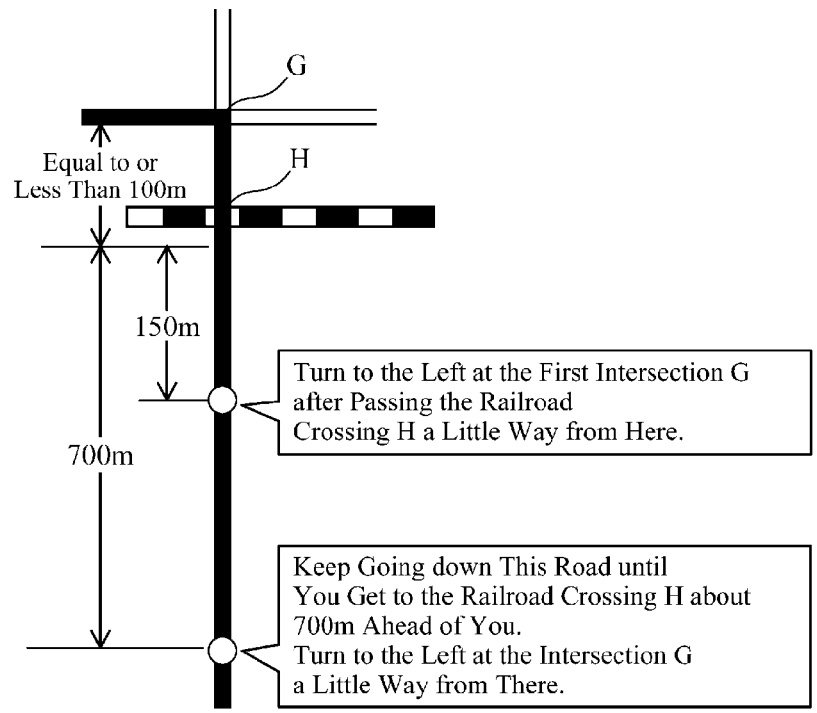
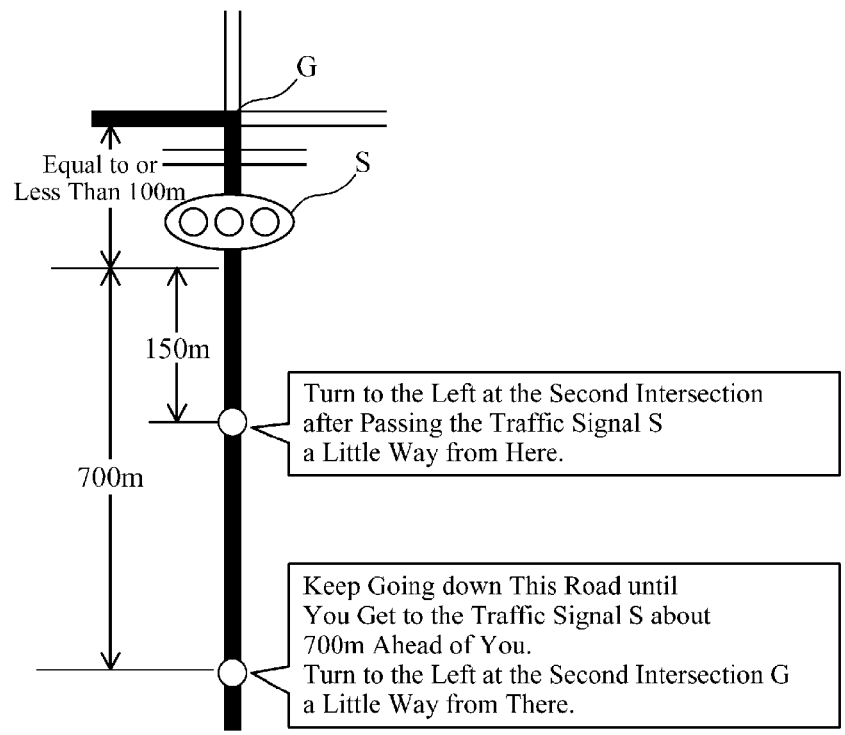

NAVIGATION DEVICE

FIELD OF THE INVENTION

The present invention relates to a navigation device which provides route guidance for a driver who is driving a vehicle by voice by using a target which is easy for the driver to understand.

BACKGROUND OF THE INVENTION

Conventionally, as such a navigation device, there has been proposed a navigation device including an acquiring unit for acquiring position data about the positions of distinctive objects located along the road which a vehicle is traveling, and a guidance time control unit for controlling a guidance start time at which the navigation device starts providing route guidance by voice by using the position of a distinctive object. For example, a related art navigation device disclosed by patent reference 1 makes a distinctive object which is easy for a driver to find available as a target for guidance by using a vehicle-mounted camera and a position data acquiring unit for acquiring position data about the positions of distinctive objects located along a road which a vehicle is traveling.

RELATED ART DOCUMENT

Patent Reference

Patent reference 1: Japanese Unexamined Patent Application Publication No. Hei 11-248477

SUMMARY OF THE INVENTION

Problems to be Solved by the Invention

A problem with the related art navigation device disclosed by the above-mentioned patent reference 1 is, however, that because what type of positional relationship exists between an intersection for guidance where the navigation device will provide guidance on a right or left turn and a distinctive object is not taken into consideration in the route guidance, concretely, no measure of notifying any positional relationship between them is taken, it is difficult for the driver to easily identify an intersection for guidance where the driver should make a right or left turn.

The present invention is made in order to solve the above-mentioned problem, and it is therefore an object of the present invention to provide a navigation device which, when there is a target which can be a landmark for guidance before or after an intersection for guidance, provides guidance which takes information about the target into consideration for a driver to enable the driver to easily identify the intersection for guidance.

Means for Solving the Problem

In accordance with the present invention, there is provided a navigation device including: a target candidate extracting unit for extracting a plurality of target candidates located along a guidance route from a map database on a basis of a vehicle position, the guidance route, and intersection information about a target intersection for guidance; a target determining unit for determining whether or not each of the target candidates extracted by the target candidate extracting unit should be used as a target on a basis of a positional relationship between the target candidate and the target intersection for guidance; a guidance sentence generating unit for generating a guidance sentence by using the target determined by the target determining unit; and a sound output unit for outputting voice guidance on a basis of the guidance sentence generated by the guidance sentence generating unit.

Advantages of the Invention

Because the navigation device according to the present invention concretely notifies the driver of a situation of a section extending from the target to the target intersection for guidance by using the target, there is provided an advantage of enabling the driver to easily identify the target intersection for guidance.

BRIEF DESCRIPTION OF THE FIGURES

FIG. 5 is a view showing an example of guidance provided by the navigation device in accordance with Embodiment 1;

EMBODIMENTS OF THE INVENTION

Hereafter, the preferred embodiments of the present invention will be described in detail with reference to the accompanying drawings.

Embodiment 1

Figure 1:
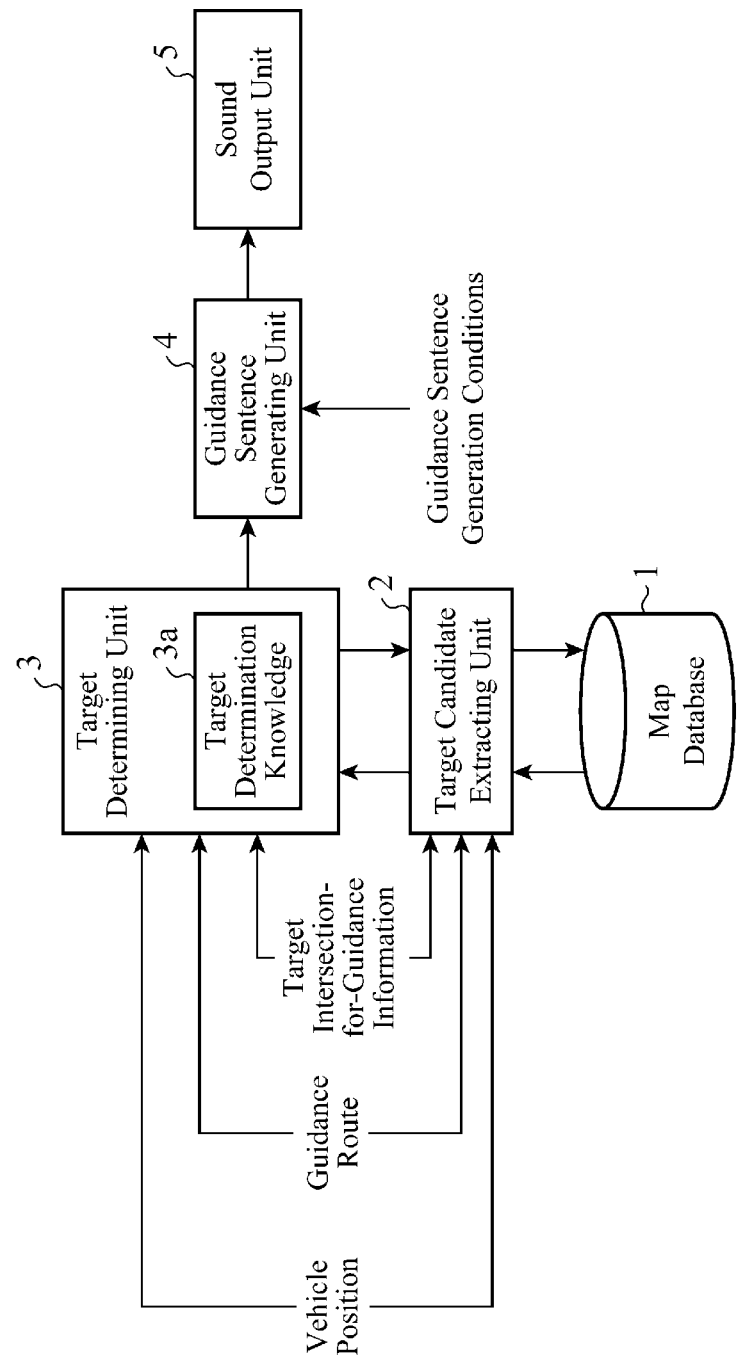
FIG. 1 is a block diagram showing the structure of a main part of a navigation device in accordance with Embodiment 1.

FIG. 1 is a block diagram showing the structure of a main part of a navigation device in accordance with Embodiment 1 of the present invention. The navigation device is provided with a map database 1, a target candidate extracting unit 2, a target determining unit 3, a guidance sentence generating unit 4, and a sound output unit 5.

Figure 2:
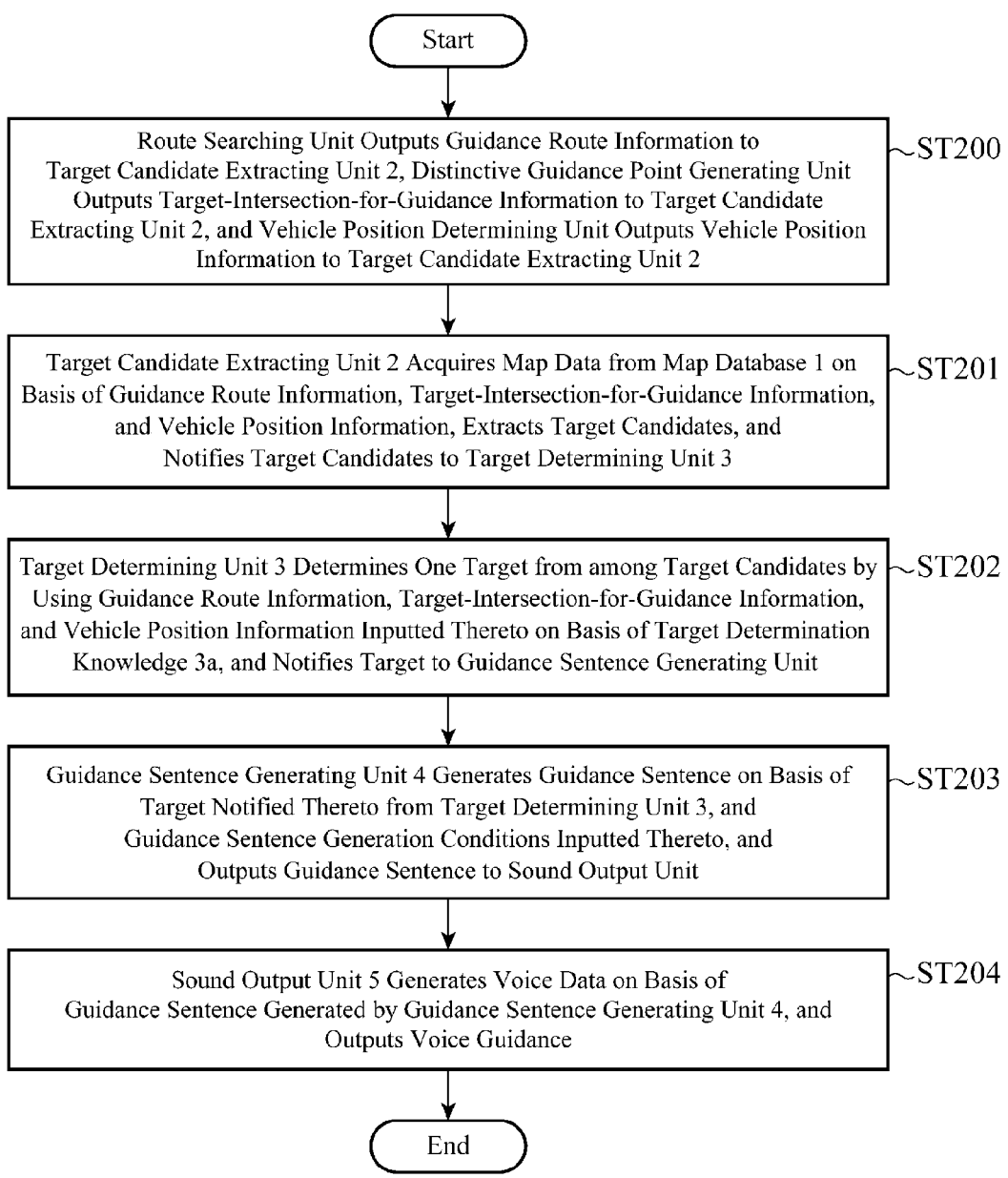
FIG. 2 is a flow chart explaining the operation of the navigation device in accordance with Embodiment 1.

FIG. 2 is a flow chart for explaining the operation of the navigation device in accordance with Embodiment 1. First, when the navigation device starts its operation, information about a guidance route which is searched for by a not-shown route searching unit, target-intersection-for-guidance information about target intersections for guidance which are distinctive guidance points (various pieces of information about the positions of intersections and so on), the target-intersection-for-guidance information being generated by a not-shown distinctive guidance point generating unit, information about the position of a vehicle which is determined by a vehicle position determining unit are inputted to the target candidate extracting unit 2 (step ST200). The target candidate extracting unit 2 then acquires map data from the map database 1 on the basis of the guidance route information, the target-intersection-for-guidance information, and the vehicle position information which are inputted thereto, extracts target candidates from the map data acquired thereby, and notifies the target candidates to the target determining unit (step ST201).

The target determining unit 3 then determines one target from among the target candidates notified thereto by using the guidance route information, the target-intersection-for-guidance information, and the vehicle position information, which are inputted thereto, on the basis of knowledge 3a about target determination for storing criteria for narrowing the target candidates to one target candidate, and notifies the target determined thereby to the guidance sentence generating unit (step ST202). The guidance sentence generating unit 4 generates a guidance sentence on the basis of the target notified thereto from the target determining unit 3 on a guidance sentence generation condition inputted thereto from a not-shown guidance sentence generation condition generating unit, and outputs the guidance sentence (step ST203). The sound output unit 5 then generates voice data on the basis of the guidance sentence generated by the guidance sentence generating unit 4 and outputs voice guidance (step ST204), and the navigation device ends the operation.

Figure 3:
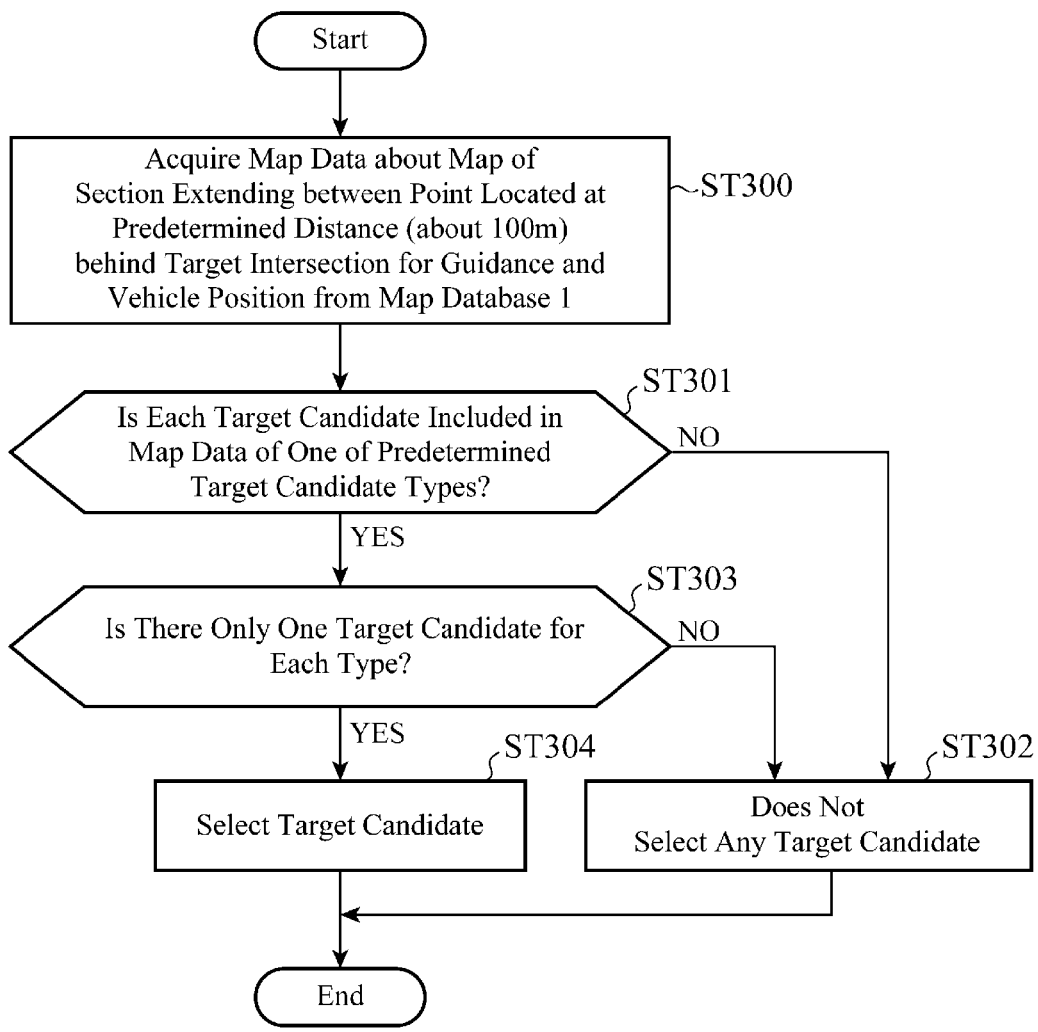
FIG. 3 is a flow chart explaining the operation of a target candidate extracting unit.

FIG. 3 is a flow chart explaining the operation of the target candidate extracting unit 2. When the target candidate extracting unit starts its operation, the target candidate extracting unit receives the information about the guidance route which is searched for by the not-shown route searching unit, the target-intersection-for-guidance information which is generated by the not-shown distinctive guidance point generating unit, and the information about the vehicle position which is determined by the not-shown vehicle position determining unit, and acquires the map data about a map of a section extending between a point located at a predetermined distance (about 100 m) behind the target intersection for guidance and the vehicle position from the map database 1 (step ST300). The target candidate extracting unit then determines whether or not each of target candidates included in the map data acquired thereby is of one of the following types: "traffic signal S, highway entrance, railroad crossing H, tunnel, national road, and so on" which are predetermined as target candidate types (step ST301).

In above-mentioned step ST301, the target candidate extracting unit can make a distinction between a tunnel exit and a tunnel entrance for "tunnel" to define them as different types. In a case in which an entrance of a tunnel is selected as a target for guidance, when the tunnel has a branch therein, the navigation device can output voice guidance which is easy for the driver to grasp a concrete positional relationship, such as "Turn to the right at the first intersection in the tunnel after entering the tunnel." Further, in a case in which an exit of a tunnel is selected as a target for guidance, the navigation device can output voice guidance which is easy for the driver to grasp a concrete positional relationship, such as "Turn to the right at the second intersection after exiting the tunnel." Further, the target candidates are not limited to those each of which is of one of the following types: "traffic signal S, highway entrance, railroad crossing H, tunnel, national road, and so on." For example, when other pieces of information directly available as the target, such as an elevated object O, a road sign (roadside-mounted sign or the like), a road K curved like a crank, a road marking (traffic sign painted on the road), and specific commercial establishment, are stored in the map database 1, those pieces of information can be defined as candidates available as the target.

When the result of the determination of above-mentioned step ST301 shows YES, the target candidate extracting unit determines whether or not there is only one target candidate within the section extending from the vehicle position to the point located at the predetermined distance (about 100 m) behind the target intersection for guidance for each of the types (step ST303), and, when determining that there is only one target candidate within the section for one of the types, selects the only one target candidate for this type as a final target candidate for this type (step ST304). In contrast, when the result of this determination shows NO, the target candidate extracting unit shifts to step ST302 and does not select any target candidate for the type as a final target candidate for the type. This is because if the navigation device outputs voice guidance on each of plural targets of one type which appear in a section extending to the target intersection for guidance, the driver cannot identify each of the plural targets and therefore it becomes difficult for the driver to specify the target intersection for guidance. Therefore, the target candidate extracting unit excludes plural target candidates of one type which appear within the section from the candidates available as the target. For example, in a situation in which two or more intersections each with a traffic signal exist within the section extending to the target intersection for guidance, when the navigation device provides the following voice guidance: "Turn to the right after passing the traffic signal," the driver cannot identify to which one of the two or more traffic signals the traffic signal in the voice guidance refers.

The target determining unit 3 receives the position of the target intersection generated by the not-shown distinctive guidance point generating unit and the vehicle position determined by the not-shown vehicle position determining unit, and selects one target candidate from among the target candidates (traffic signal S, highway entrance, railroad crossing H, tunnel, national road, etc.) notified thereto from the target candidate extracting unit 2 by taking into consideration a positional relationship between each of the target candidates and the target intersection for guidance on the basis of the target determination knowledge 3a stored therein to define the target candidate selected thereby as the target.

Figure 4:
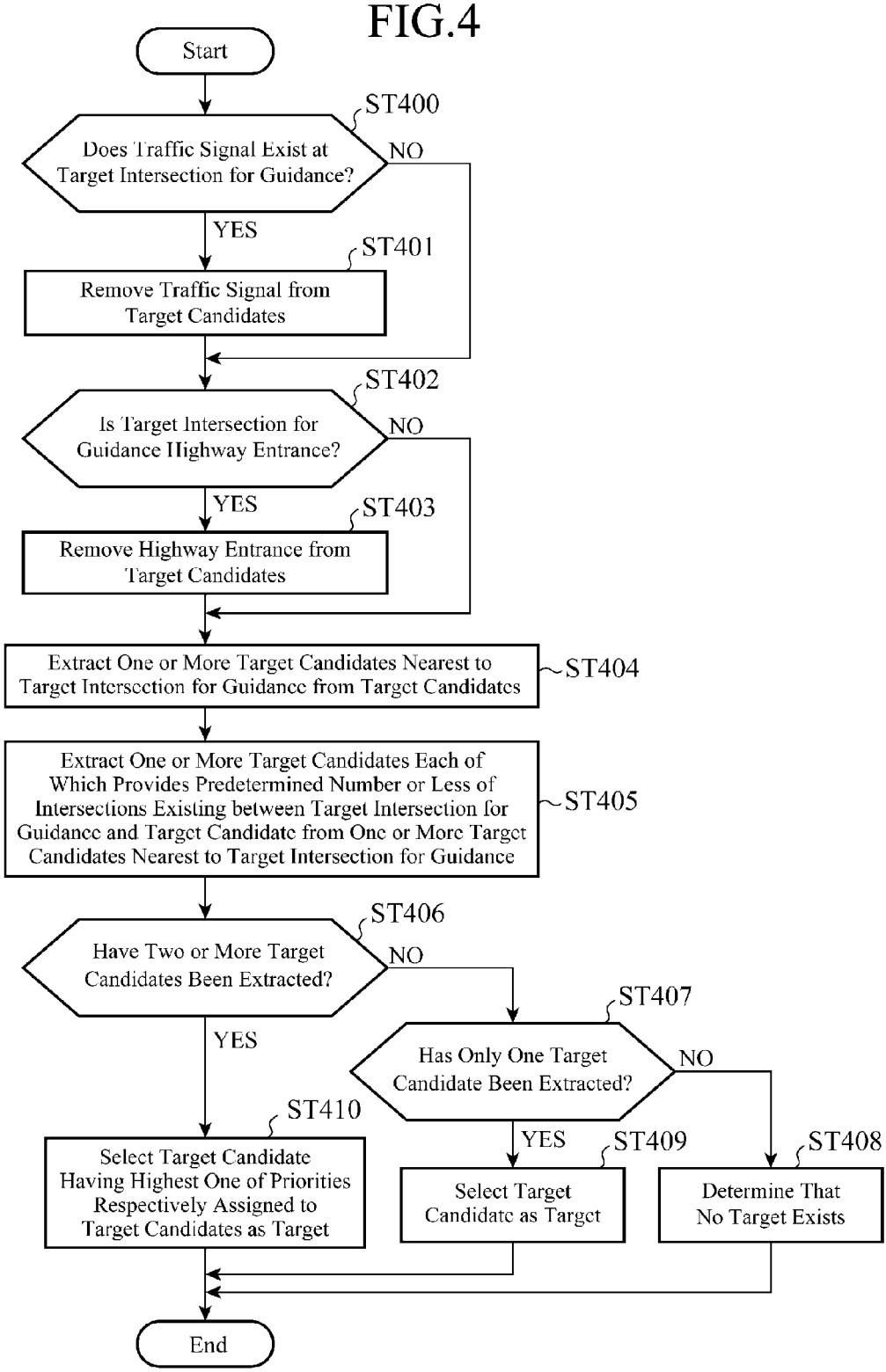
FIG. 4 is a flow chart explaining the operation of a target determining unit.

FIG. 4 is a flow chart explaining this operation of the target determining unit 3. When the target determining unit starts its operation, the target determining unit receives the information about the guidance route which is searched for by the not-shown route searching unit, the target-intersection-for-guidance information (various pieces of information about the positions of intersections and so on) which is generated by the not-shown distinctive guidance point generating unit, and the information about the vehicle position determined by the not-shown vehicle position determining unit, and determines whether a traffic signal exists in the target intersection for guidance (step ST400). When the result of this determination shows YES, the target determining unit removes the traffic signal from the target candidates (step ST401) and then determines whether or not the target intersection for guidance is a highway entrance (step ST402), whereas when the result of the determination in step ST400 shows NO, the target determining unit simply determines whether or not the target intersection for guidance is a highway entrance. When the result of the determination in step ST402 shows YES, the target determining unit removes the highway entrance from the target candidates (step ST403). As a result, the navigation device can prevent a voice output redundantly including a description for explaining the target intersection for guidance, and a description for explaining the target to be used for guidance on the target intersection from being generated. For example, the navigation device can prevent a voice output which causes the driver to get confused, such as "Turn to the right at the traffic signal after passing the traffic signal," from being generated.

Next, the target determining unit extracts one or more target candidates each of which is the nearest to the target intersection for guidance from the remaining target candidates (step ST404). This is because when outputting voice guidance on the target intersection for guidance with reference to the target, the shorter the distance between the target intersection for guidance and the target, the easier it is to understand a positional relationship between them. The target determining unit then extracts one or more target candidates each of which provides a predetermined number (e.g. three) or less of intersections existing between the target intersection for guidance and the target candidate itself from the one or more target candidates extracted in step ST404 (step ST405). This is because when there exists many intersections between a target candidate and the target intersection for guidance and this target candidate is selected as the target, it is harder for the driver to understand a positional relationship between the target intersection for guidance and the target. Therefore, the target determining unit extracts one or more target candidates each of which provides the predetermined number or less of intersections existing between the target intersection for guidance and the target candidate itself.

Next, the target determining unit determines whether the target determining unit has finally extracted two or more target candidates (step ST406). When the result of the determination in above-mentioned step ST406 shows NO, no extracted target candidate exists or only one target candidate exists. Therefore, when the result of the determination in above-mentioned step ST406 shows NO, the target determining unit determines whether the target determining unit has finally extracted only one target candidate (step ST407). Because no target candidate exists when the result of the determination in above-mentioned step ST407 shows NO, the target determining unit determines that no target exists (step ST408), and ends the operation. In contrast, because the target candidates have been narrowed to the only one target candidate when the result of the determination in above-mentioned step ST407 shows YES, the target determining unit selects the target candidate as the target (step ST409), and ends the operation. Because two or more target candidates exist when the result of the determination in above-mentioned step ST406 shows YES, the target determining unit refers to the order of priorities respectively assigned to the target candidates, selects the target candidate having the highest priority from among the target candidates (step ST410), and ends the operation.

The consideration of a positional relationship between the target intersection for guidance and each of the target candidates which is mentioned in this embodiment means that the distance between the target intersection for guidance and each of the target candidates, the number of intersections existing between the target intersection for guidance and each of the target candidates, etc. are taken into consideration. Further, the target determination knowledge 3a is referred to in the operation of determining the target of the target determining unit 3, and stores criteria for narrowing the target candidates to one target candidate. The criteria used in the flow chart of FIG. 4 will be shown below.

The criterion that no traffic signal exists at the target intersection for guidance The criterion that the target intersection for guidance is not a highway entrance The criterion that the distance from the target intersection for guidance to the target candidate is the shortest The criterion that the number of intersections existing between the target intersection for guidance and the target candidate is equal to or smaller than the predetermined number The predetermined number in the determination of whether or not the number of intersections existing between the target intersection for guidance and the target candidate is equal to or smaller than the predetermined number The order of priorities respectively assigned to the target candidates The target determination knowledge 3a can store another criterion for narrowing the target candidates to one target candidate in addition to the above-mentioned criteria. For example, the target determination knowledge can store a criterion of "giving a higher priority to a target candidate located before the target intersection for guidance than to a target candidate located behind the target intersection for guidance." This is because while the driver can identify a target located at a distance (e.g. 100 m) behind the target intersection for guidance more easily when the vehicle is approaching the target intersection for guidance, the driver may concentrate on making a right or left turn as the vehicle approaches the target intersection for guidance. Although this operation is not shown, the target determining unit carries out the processing shown in the flow chart of FIG. 4 only on the target candidates located before the target intersection for guidance first. Then, when, in step ST408, determining that all the target candidates located before the target intersection for guidance are "not the target," the target determining unit can implement the above-mentioned criterion by also carrying out the processing shown in the flow chart of FIG. 4 on the target candidates located behind the target intersection for guidance. Further, the target determination knowledge 3a can store the types of target candidates which are to be extracted by the target candidate extracting unit 2 as a criterion. In this case, the target candidate extracting unit 2 refers to the target determination knowledge 3a to extract target candidates.

The guidance sentence generating unit 4 generates a guidance sentence on the basis of both conditions for generating a guidance sentence which are generated by the not-shown guidance sentence generation condition generating unit (e.g. the remaining distance to the target intersection for guidance, the direction in which the driver should make a right or left turn at the target intersection for guidance, and so on), and the target determined by the target determining unit 3. The sound output unit 5 then generates voice data on the basis of the guidance sentence generated by the guidance sentence generating unit 4, and outputs voice guidance.

FIG. 5 shows examples of the guidance. In the example shown in an upper part of this figure, the navigation device uses a railroad crossing H as the target, and outputs the following voice guidance: "Turn to the left at the first intersection G after passing the railroad crossing H a little way from here." In the example shown in a lower part of the figure, the navigation device uses a traffic signal S as the target, and outputs the following voice guidance: "Turn to the left at the second intersection after passing the traffic signal a little way from here."

As mentioned above, the navigation device according to this Embodiment 1 can use a target located behind or before a target intersection for guidance on the guidance route to concretely notify a situation which employs a positional relationship between the target and the target intersection for guidance to the driver, there is provided an advantage of making it easy for the driver to identify the target intersection for guidance. In addition, because the navigation device according to this embodiment provides guidance on a series of situations of a section extending up to the target intersection for guidance, there is provided a further advantage of making it easy for the driver to grasp the position where the vehicle is currently traveling.

Embodiment 2

Figure 6:
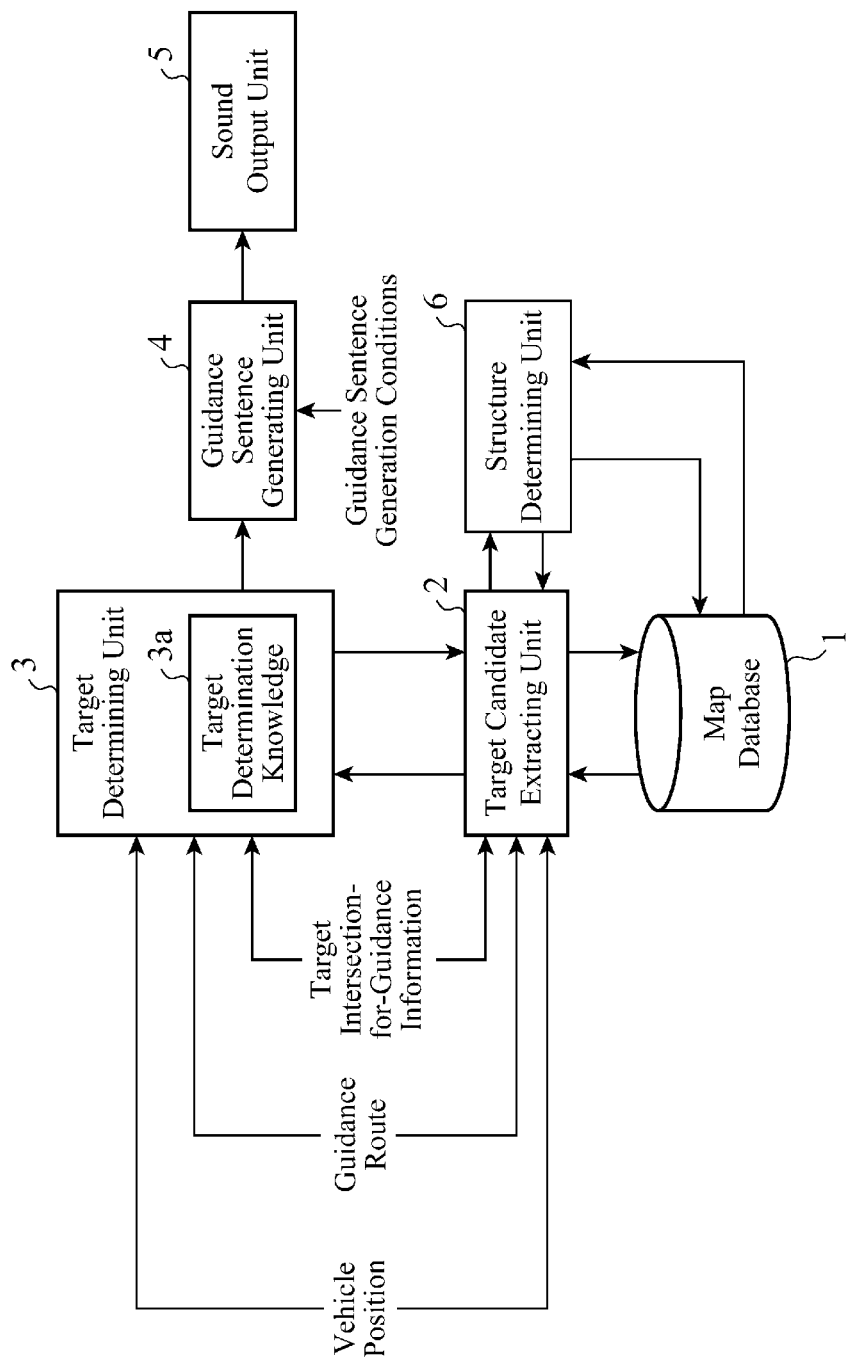
FIG. 6 is a block diagram showing the structure of a main part of a navigation device in accordance with Embodiment 2.

FIG. 6 is a block diagram showing the structure of a main part of a navigation device in accordance with Embodiment 2 of the present invention. In the navigation device, a structure determining unit 6 is disposed and is connected to a map database 1 and a target candidate extracting unit 2. Because the other structural components of the navigation device are the same as those according to Embodiment 1 shown in FIG. 1, the same components are designated by the same reference numerals as those shown in FIG. 1, and a duplicate explanation of the components will be omitted hereafter.

Figure 7:
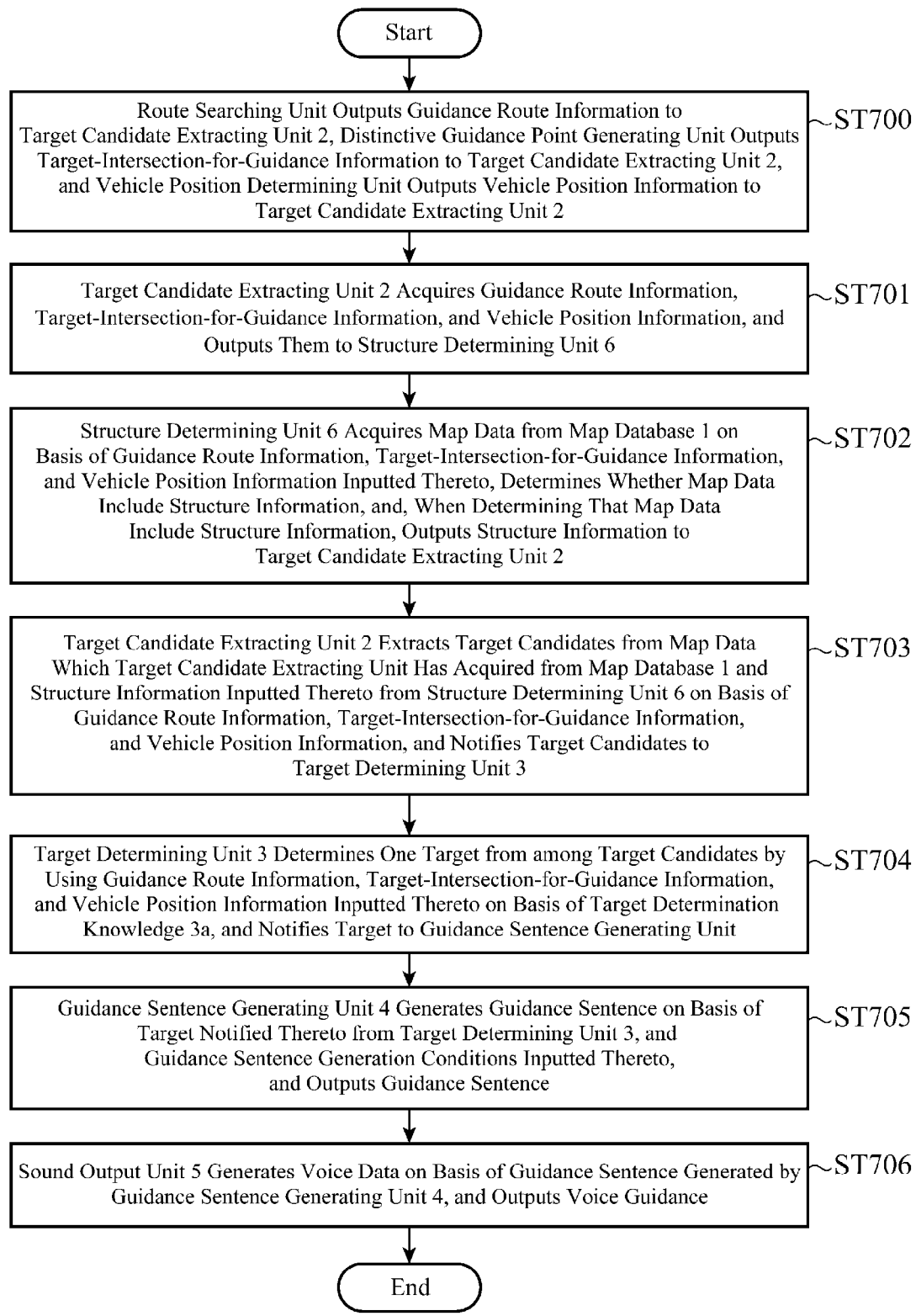
FIG. 7 is a flow chart explaining the operation of the navigation device in accordance with Embodiment 2.

Operation steps according to this Embodiment 2 are shown in FIG. 7. Although these steps are nearly the same as the operation steps according to Embodiment 1 shown in FIG. 2, steps ST701, ST702, and ST703 differ from those according to Embodiment 1. In this Embodiment 2, the target candidate extracting unit 2, in step ST701, outputs guidance route information, target-intersection-for-guidance information, and vehicle position information to the structure determining unit 6. The structure determining unit 6, in step ST702, acquires map data from the map database 1 on the basis of the guidance route information, the target-intersection-for-guidance information, and the vehicle position information which are inputted thereto, determines whether the map data include structure information about structures, and, when determining that the map data include structure information, outputs the structure information to the target candidate extracting unit 2. The target candidate extracting unit 2, in step ST703, extracts target candidates from the map data which the target candidate extracting unit has acquired from the map database 1 and the structure information inputted thereto from the structure determining unit 6 on the basis of the guidance route information, the target-intersection-for-guidance information, and the vehicle position information, and notifies the target candidates to a target determining unit.

As mentioned above, the navigation device according to Embodiment 2 is characterized in that the structure determining unit 6 determines whether the map data acquired thereby include structure information about structures, such as an elevated object O, which is not stored directly in the map database 1, and, when determining that the map data include structure information, outputs the structure information to the target candidate extracting unit, so that the structure information can be used as target candidates. As a result, the navigation device can provide information about a structure which does not exist in the map database 1 and a positional relationship between the structure and the target intersection for guidance for the driver.

Figure 8:
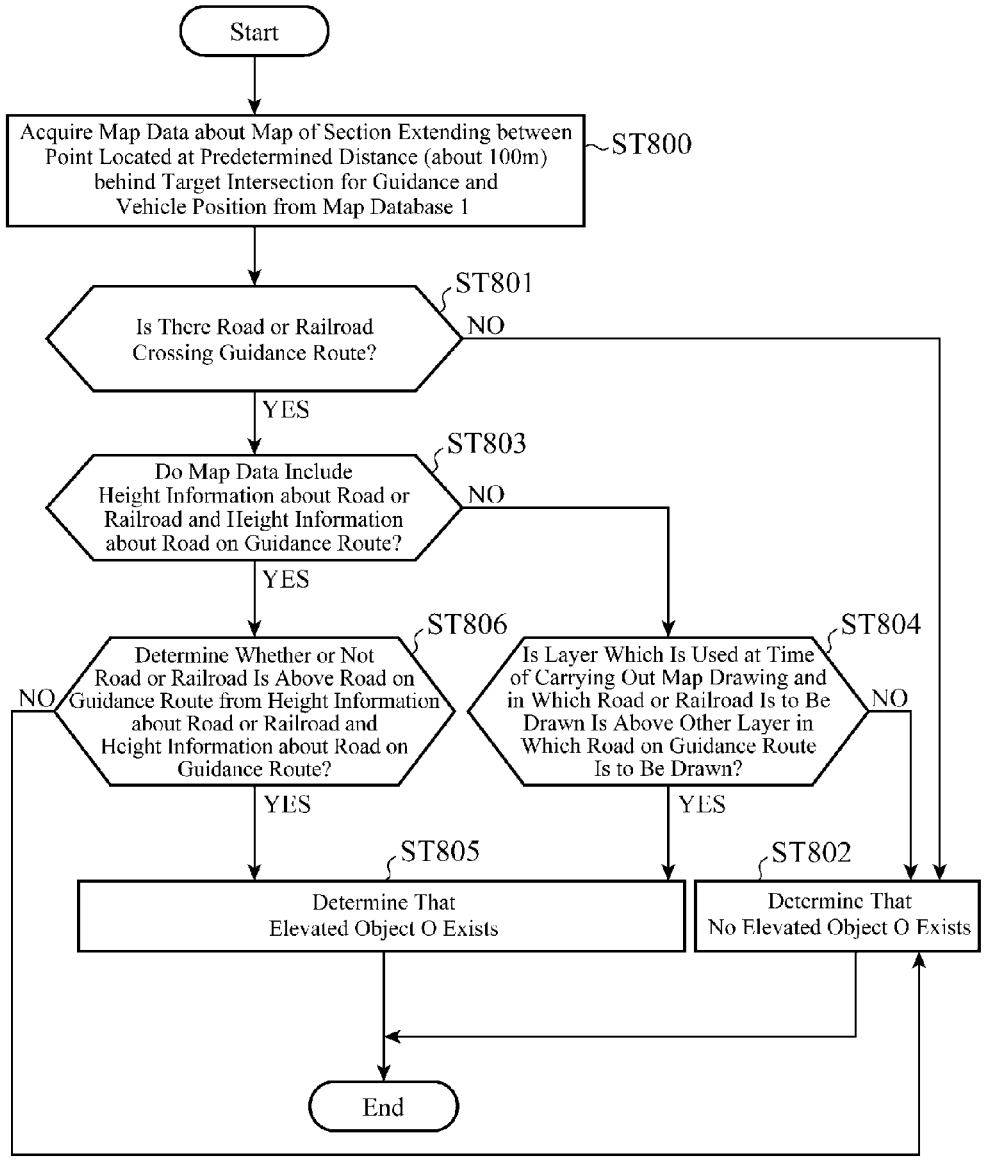
FIG. 8 is a flow chart explaining the operation of a structure determining unit.

An example of this operation of the structure determining unit 6 will be explained with reference to FIG. 8. When the structure determining unit starts its operation, the structure determining unit receives the information about the guidance route which is searched for by a not-shown route searching unit, the target-intersection-for-guidance information (various pieces of information about the positions of intersections and so on) which is generated by a not-shown distinctive guidance point generating unit, and the information about the vehicle position determined by a not-shown vehicle position determining unit, acquires the map data about a map of a section extending between a point located at a predetermined distance (about 100 m) behind the target intersection for guidance and the vehicle position from the map database 1 (step ST800). The structure determining unit then determines whether the map data include information about a road or railroad crossing the guidance route (step ST801).

When the result of the determination in above-mentioned step ST801 shows NO, the structure determining unit shifts to step ST802 and determines that no elevated object O exists along the route. In contrast, when the result of the determination in above-mentioned step ST801 shows YES, the structure determining unit determines whether the map data include information about the altitude of the road or railroad extracted from the map database 1 and information about the altitude of the corresponding road on the guidance route (step ST803), and, when the result of this determination shows NO, shifts to step ST804. This is because there is a case in which information about altitude does not necessarily exist in the map database 1.

The structure determining unit, in step ST804, determines whether or not a layer which is used at the time when the navigation device carries out map drawing based on the map data from the map database 1 and in which the road or railroad is to be drawn is above another layer in which the road on the guidance route is to be drawn. This is because layers (drawing order) show a relationship between the altitudes of objects to be drawn in a map having a detailed scale shown by map drawing data which the map database 1 has. When the result of the determination in above-mentioned step ST804 shows NO, the structure determining unit shifts to step ST802 and determines that no elevated object O exists along the route. In contrast, when the result of the determination in above-mentioned step ST804 shows YES, the structure determining unit shifts to step ST805 and determines that an elevated object O exists along the route, and ends the operation.

When the result of the determination in above-mentioned step ST803 shows YES, the structure determining unit shifts to step ST806 and determines whether or not the road or railroad is above the road on the guidance route from the information about the altitude of the road or railroad and the information about the altitude of the road on the guidance route, and, when the result of this determination shows NO, shifts to step ST802 and determines that no elevated object O exists along the route. In contrast, when the result of the determination in above-mentioned step ST806 shows YES, the structure determining unit determines that an elevated object O exists and ends the operation. The structure determining unit, in step ST806, can determine whether or not the difference in altitude between the road or railroad and the road on the guidance route is equal to or larger than a predetermined difference. As a result, the navigation device can extract an elevated object which is easy for the driver to identify as a target.

Figure 9:
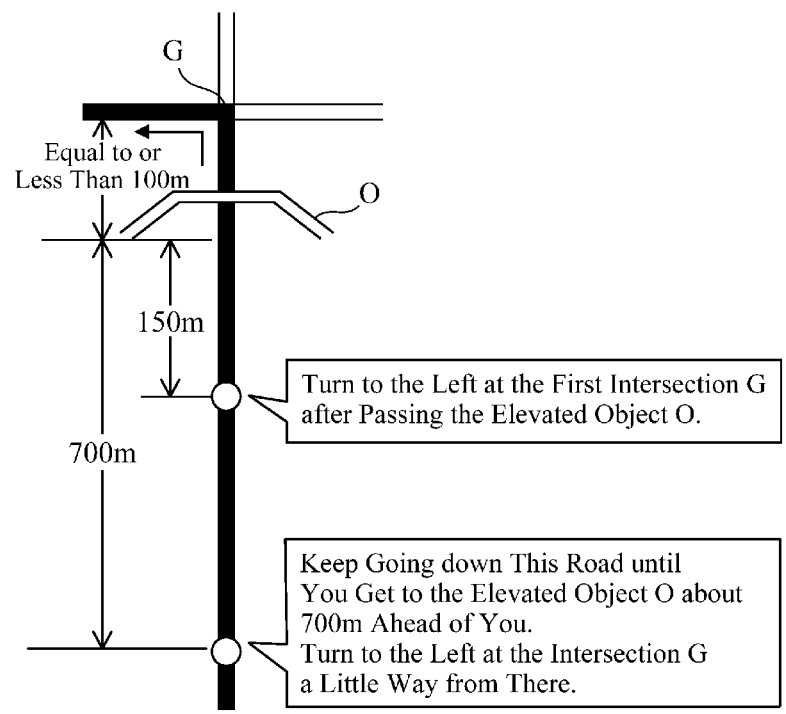
FIG. 9 is a view showing an example of guidance provided by the navigation device in accordance with Embodiment 2.

When determining in the above-mentioned determination operation that an elevated object O exists along the route, the structure determining unit notifies all elevated objects O to the target candidate extracting unit 2. The target candidate extracting unit 2 extracts target candidates from the map data which the target candidate extracting unit has acquired from the map database 1, and the structure information inputted from the structure determining unit 6 on the basis of the guidance route information, the target-intersection-for-guidance information, and the vehicle position information, and notifies the target candidates to the target determining unit 3. The target determining unit 3 determines one target from among the target candidates notified thereto by using the guidance route information, the target-intersection-for-guidance information, and the vehicle position information, which are inputted thereto, on the basis of knowledge 3a about target determination, and notifies the target determined thereby to a guidance sentence generating unit. The guidance sentence generating unit 4 generates a guidance sentence on the basis of the target notified thereto from the target determining unit 3, and guidance sentence generation conditions inputted thereto from a guidance sentence generation condition generating unit, and outputs the guidance sentence. A sound output unit 5 generates voice data on the basis of the guidance sentence generated by the guidance sentence generating unit 4, and outputs voice guidance. As a result, the navigation device can provide voice guidance including a positional relationship between the elevated object O defined as the target and the target intersection for guidance, such as "Turn to the left at the first intersection G after passing the elevated object O" as shown in FIG. 9.

The operation shown above is an example, and the structure determining unit 6 can be constructed in such a way as to, in step ST701 of FIG. 7, receive the guidance route which is searched for by the route searching unit not shown in FIG. 6, the target-intersection-for-guidance information which is generated by the distinctive guidance point generating unit not shown in FIG. 6, and the vehicle position which is determined by the vehicle position determining unit not shown in FIG. 6, instead of acquiring the guidance route information, target-intersection-for-guidance information, and the vehicle position information from the target candidate extracting unit 2.

Further, the structure determining unit 6 can be constructed in such a way as to, in step ST702 of FIG. 7, acquire data about structures from a not-shown communication unit to determine whether or not there is a structure along the route, instead of acquiring map data from the map database 1 to determine whether the map data acquired thereby include structure information about structures. For example, when no information about road signs (roadside-mounted signs and the like), specific commercial establishment, etc. is stored in the map database 1, the structure determining unit can acquire information about road signs and the like from a not-shown communication unit to determine whether or not there is a structure along the route, and, when determining that there is a structure along the route, notify the structure to the target candidate extracting unit 2. As a result, the navigation device can provide guidance such as "Turn to the right at the first intersection after passing the blue sign." In addition, the structure determining unit 6 can be constructed in such a way as to, in step ST702, notify the structure to the target determining unit 3.

As mentioned above, because the navigation device according to this Embodiment 2 can use an elevated object O, which crosses over the guidance route and which is easy for the driver to identify, for guidance as a target located behind or before the target intersection for guidance, there is provided an advantage of being able to concretely notify a situation of a section extending from the elevated object O to the target intersection for guidance, thereby making it easy for the driver to identify the target intersection for guidance. Further, because the navigation device according to this embodiment provides guidance on a series of situations of the section extending up to the target intersection for guidance, there is provided a further advantage of making it easy for the driver to grasp the position where the vehicle is currently traveling. In addition, because the navigation device can use even information which is not stored in the map database 1 as a target, the navigation device can provide voice guidance adapted to various road situations.

Embodiment 3

Figure 10:
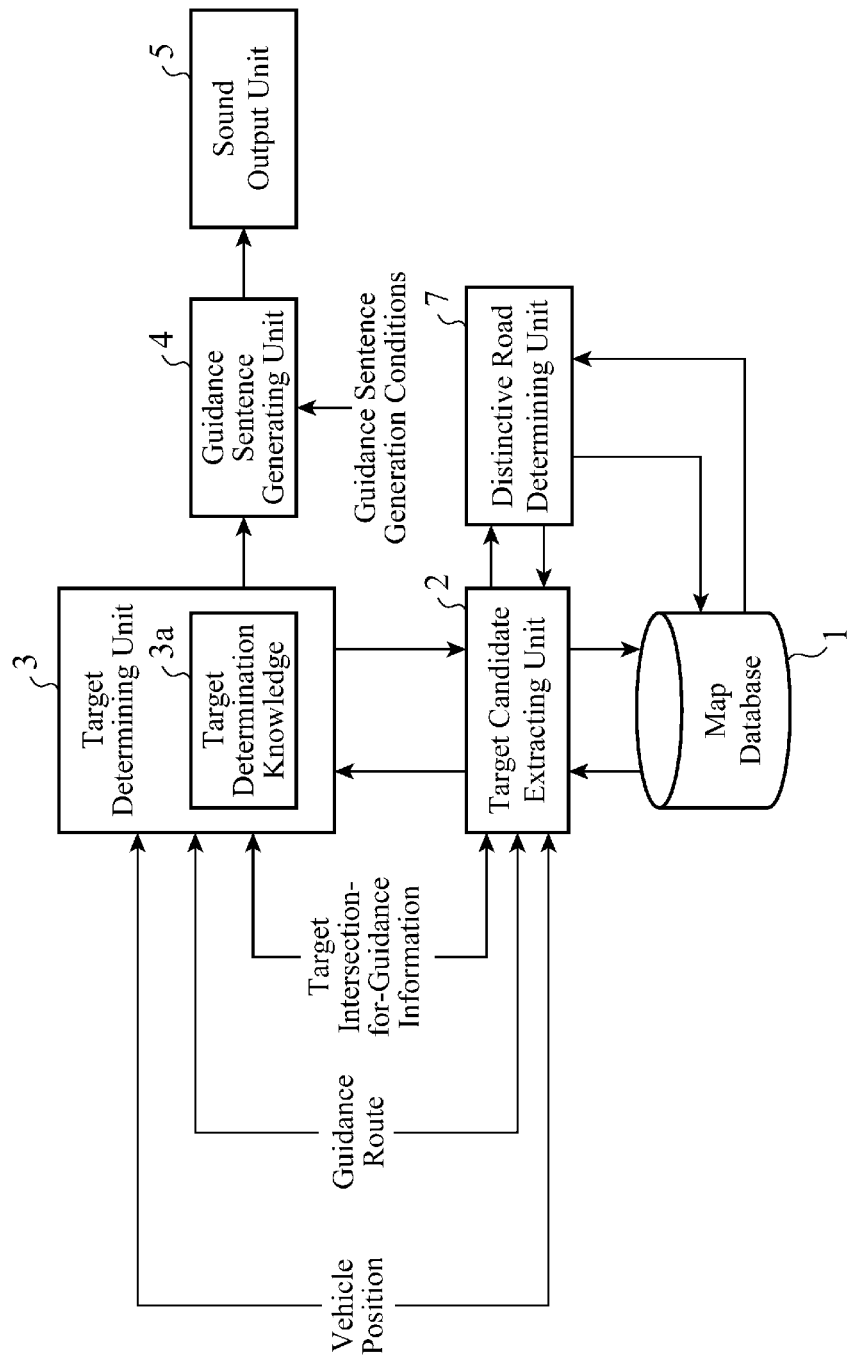
FIG. 10 is a block diagram showing the structure of a main part of a navigation device in accordance with Embodiment 3.

FIG. 10 is a block diagram showing the structure of a main part of a navigation device in accordance with Embodiment 3 of the present invention. In the navigation device, a distinctive road determining unit 7 is disposed and is connected to a map database 1 and a target candidate extracting unit 2. Because the other structural components of the navigation device are the same as those according to Embodiment 1 shown in FIG. 1, the same components are designated by the same reference numerals as those shown in FIG. 1, and a duplicate explanation of the components will be omitted hereafter.

Figure 11:
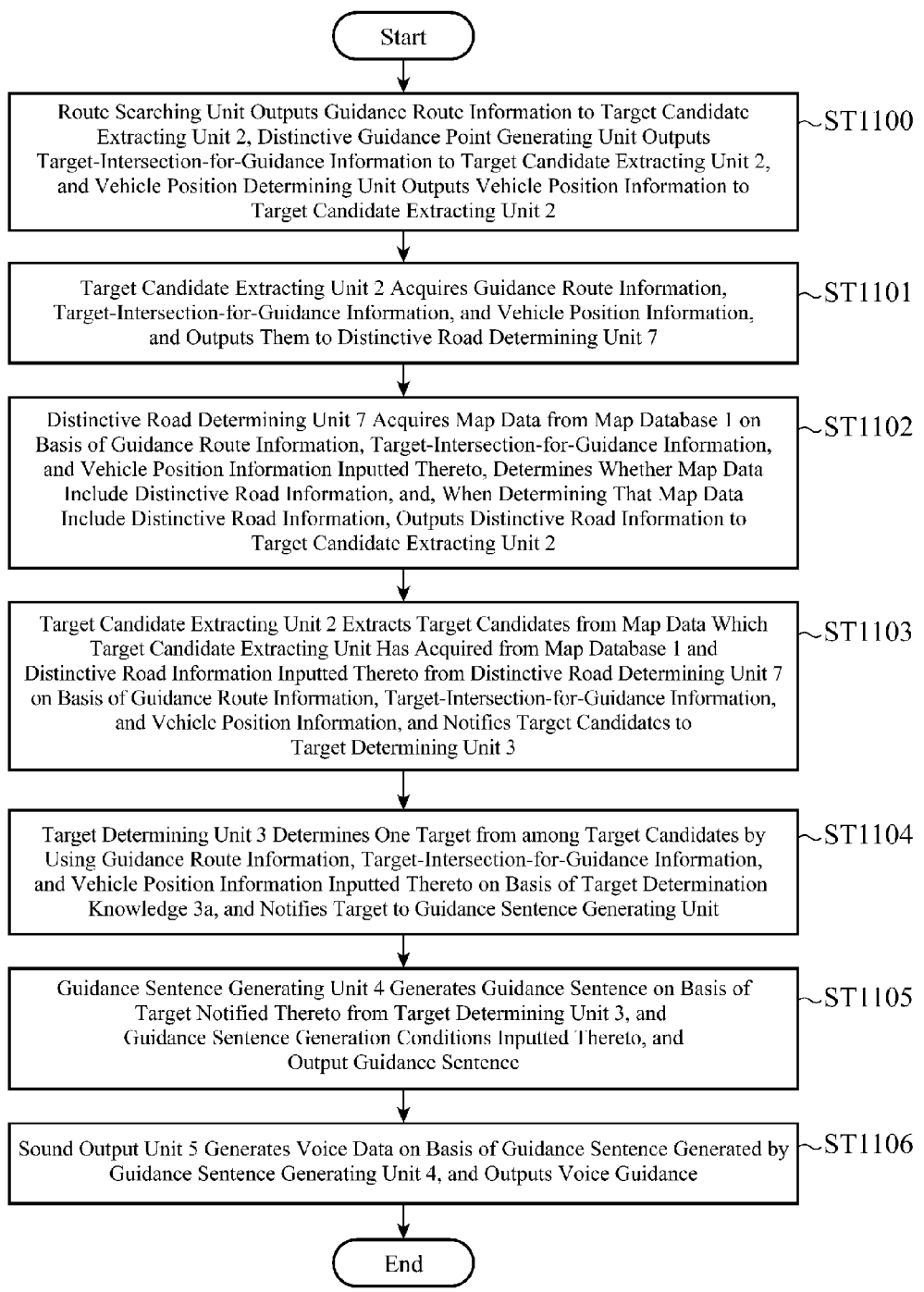
FIG. 11 is a flow chart explaining the operation of the navigation device in accordance with Embodiment 3.

Operation steps according to this Embodiment 3 are shown in FIG. 11. Although these steps are nearly the same as the operation steps according to Embodiment 2 shown in FIG. 7, steps ST1101, ST1102, and ST1103 differ from those according to Embodiment 2. In this Embodiment 3, the target candidate extracting unit 2, in step ST1101, outputs guidance route information, target-intersection-for-guidance information, and vehicle position information to the distinctive road determining unit 7. The distinctive road determining unit 7, in step ST1102, acquires map data which the navigation device has acquired from the map database 1 on the basis of the guidance route information, the target-intersection-for-guidance information, and the vehicle position information which are inputted thereto, determines whether the map data include information about a distinctive road, and, when determining that the map data include information about a distinctive road, outputs the distinctive road information to the target candidate extracting unit 2. The target candidate extracting unit 2, in step ST1103, extracts target candidates from the map data which the target candidate extracting unit has acquired from the map database 1 and the distinctive road information inputted thereto from the distinctive road determining unit 7 on the basis of the guidance route information, the target-intersection-for-guidance information, and the vehicle position information, and notifies the target candidates.

As mentioned above, the navigation device according to Embodiment 3 is characterized in that the distinctive road determining unit 7 determines whether the map data include information about a distinctive road, such as a road K curved like a crank, road information about which is not stored directly in the map database 1, and, when determining that the map data include information about a distinctive road, outputs the distinctive road information to the target candidate extracting unit, so that this distinctive road can be used as a target candidate. As a result, the navigation device can provide information about a distinctive road which does not exist in the map database 1 and a positional relationship between the distinctive road and the target intersection for guidance for the driver.

Figure 12:
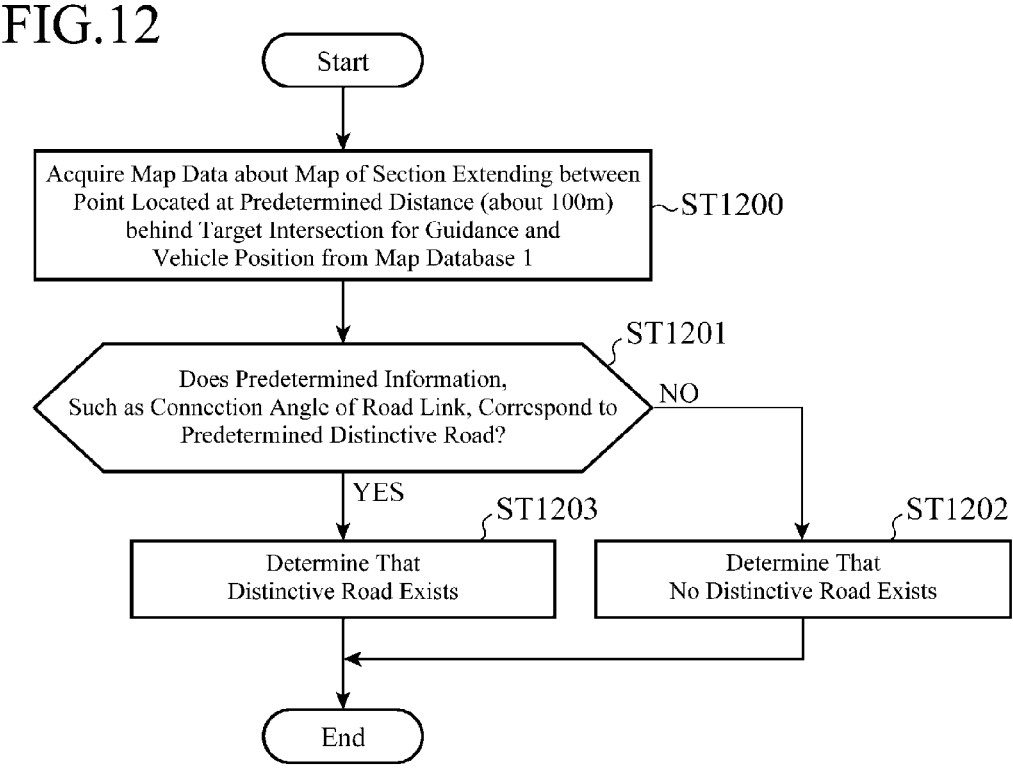
FIG. 12 is a flow chart explaining the operation of a distinctive road determining unit.

An example of this operation of the distinctive road determining unit 7 will be explained with reference to FIG. 12. When the distinctive road determining unit starts its operation, the distinctive road determining unit receives the information about the guidance route which is searched for by a not-shown route searching unit, the target-intersection-for-guidance information (various pieces of information about the positions of intersections and so on) which is generated by a not-shown distinctive guidance point generating unit, and the information about the vehicle position which is determined by a not-shown vehicle position determining unit, acquires the map data about a map of a section extending between a point located at a predetermined distance (about 100 m) behind a target intersection for guidance and the vehicle position from the map database 1 (step ST1200). The distinctive road determining unit then extracts predetermined information (the connection angle of the road link, etc.) from the acquired map data, and determines whether the predetermined information corresponds to a predetermined distinctive road (step ST1201).

When the result of the determination in above-mentioned step ST1201 shows NO, the distinctive road determining unit shifts to step ST1202 and determines that no distinctive road exists along the route. In contrast, when the result of the determination in above-mentioned step ST1201 shows YES, the distinctive road determining unit shifts to step ST1203 and determines that a distinctive road exists along the route, and ends the operation.

Figure 13:
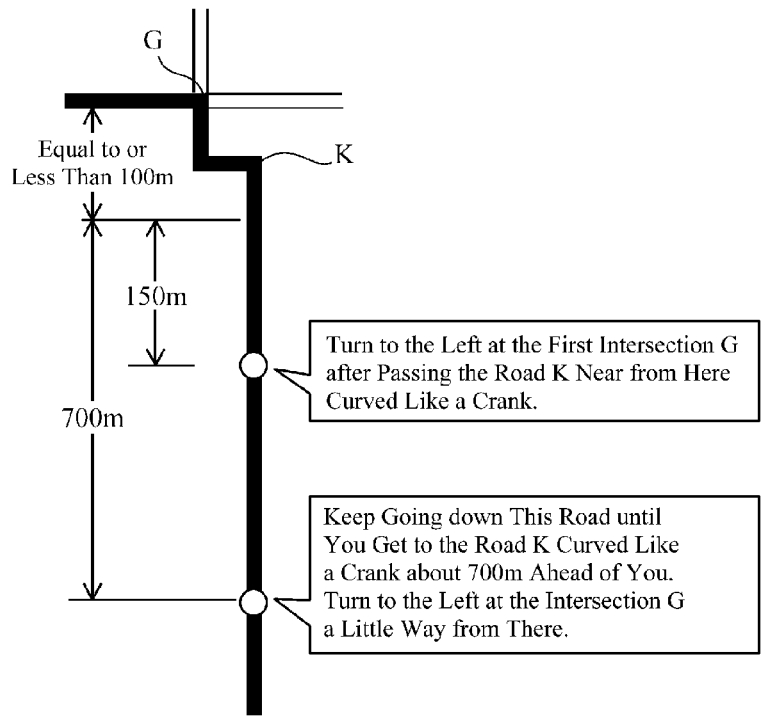
FIG. 13 is a view showing an example of guidance provided by the navigation device in accordance with Embodiment 3.

When determining in the above-mentioned determination operation that a distinctive road exists along the route, the structure determining unit notifies all distinctive roads to the target candidate extracting unit 2. The target candidate extracting unit 2 extracts target candidates from the map data which the target candidate extracting unit has acquired from the map database 1, and the distinctive roads notified thereto from the distinctive road determining unit 7 on the basis of the guidance route information, the target-intersection-for-guidance information, and the vehicle position information, and notifies the target candidates to a target determining unit 3. The target determining unit 3 determines one target from among the target candidates notified thereto by using the guidance route information, the target-intersection-for-guidance information, and the vehicle position information, which are inputted thereto, on the basis of knowledge 3a about target determination, and notifies the target determined thereby to a guidance sentence generating unit. The guidance sentence generating unit 4 generates a guidance sentence on the basis of the target notified thereto from the target determining unit 3, and guidance sentence generation conditions inputted thereto from a guidance sentence generation condition generating unit, and outputs the guidance sentence. A sound output unit 5 generates voice data on the basis of the guidance sentence generated by the guidance sentence generating unit 4, and outputs voice guidance. As a result, the navigation device can provide voice guidance including a positional relationship between the distinctive road and the target intersection for guidance, such as "Turn to the left at the first intersection G after passing the road K near from here curved like a crank" as shown in FIG. 13.

The operation shown above is an example, and the distinctive road determining unit 7 can be constructed in such a way as to, in step ST1101 of FIG. 11, receive the information about the guidance route which is searched for by the route searching unit not shown in FIG. 10, the target-intersection-for-guidance information which is generated by the distinctive guidance point generating unit not shown in FIG. 10, and the information about the vehicle position which is determined by the vehicle position determining unit not shown in FIG. 10, instead of acquiring the guidance route information, the target-intersection-for-guidance information, and the vehicle position information from the target candidate extracting unit 2.

Further, a distinctive road which the distinctive road determining unit 7 extracts in step ST1102 of FIG. 11 is not limited to a road K curved like a crank. Any road can be extracted as a distinctive road as long as the road can be determined as a distinctive road on the basis of information stored in the map database 1 including "a curve, an s-shaped curve, an uphill, a downhill, a road whose width becomes narrower along its way, a road whose width becomes wider along its way, a road whose lane number increases along its way, and a road whose lane number decreases along its way."

Further, the distinctive road determining unit 7 can be constructed in such a way as to, in step ST1102 of FIG. 11, acquire data about distinctive roads from a communication unit not shown in FIG. 10 to determine whether or not there is a distinctive road along the route, instead of acquiring map data from the map database 1 to determine whether the map data acquired thereby include information about a distinctive road. For example, when no information about the difference in altitude between points on any road is stored in the map database 1, the distinctive road determining unit 7 can acquire information about the difference in altitude between points on the road from a not-shown communication unit to determine whether or not there is a distinctive road along the route, and, when determining that there is a distinctive road along the route, notify the distinctive road to the target candidate extracting unit 2. As a result, the navigation device can provide guidance such as "Turn to the right at the first intersection after finishing going up the hill." In addition, the distinctive road determining unit 7 can be constructed in such a way as to, in step ST1102, notify the distinctive road to the target determining unit 3.

As mentioned above, because the navigation device according to this Embodiment 3 can use a distinctive road which is located on the guidance route and which is easy for the driver to identify, for guidance as a target located behind or before the target intersection for guidance, there is provided an advantage of being able to concretely notify a situation of a section extending from the distinctive road to the target intersection for guidance, thereby making it easy for the driver to identify the target intersection for guidance. Further, because the navigation device according to this embodiment provides guidance on a series of situations of the section extending up to the target intersection for guidance, there is provided a further advantage of making it easy for the driver to grasp the position where the vehicle is currently traveling. In addition, because the navigation device can use even information which is not stored in the map database 1 as a target, the navigation device can provide voice guidance adapted to various road situations.

Embodiment 4

Figure 14:
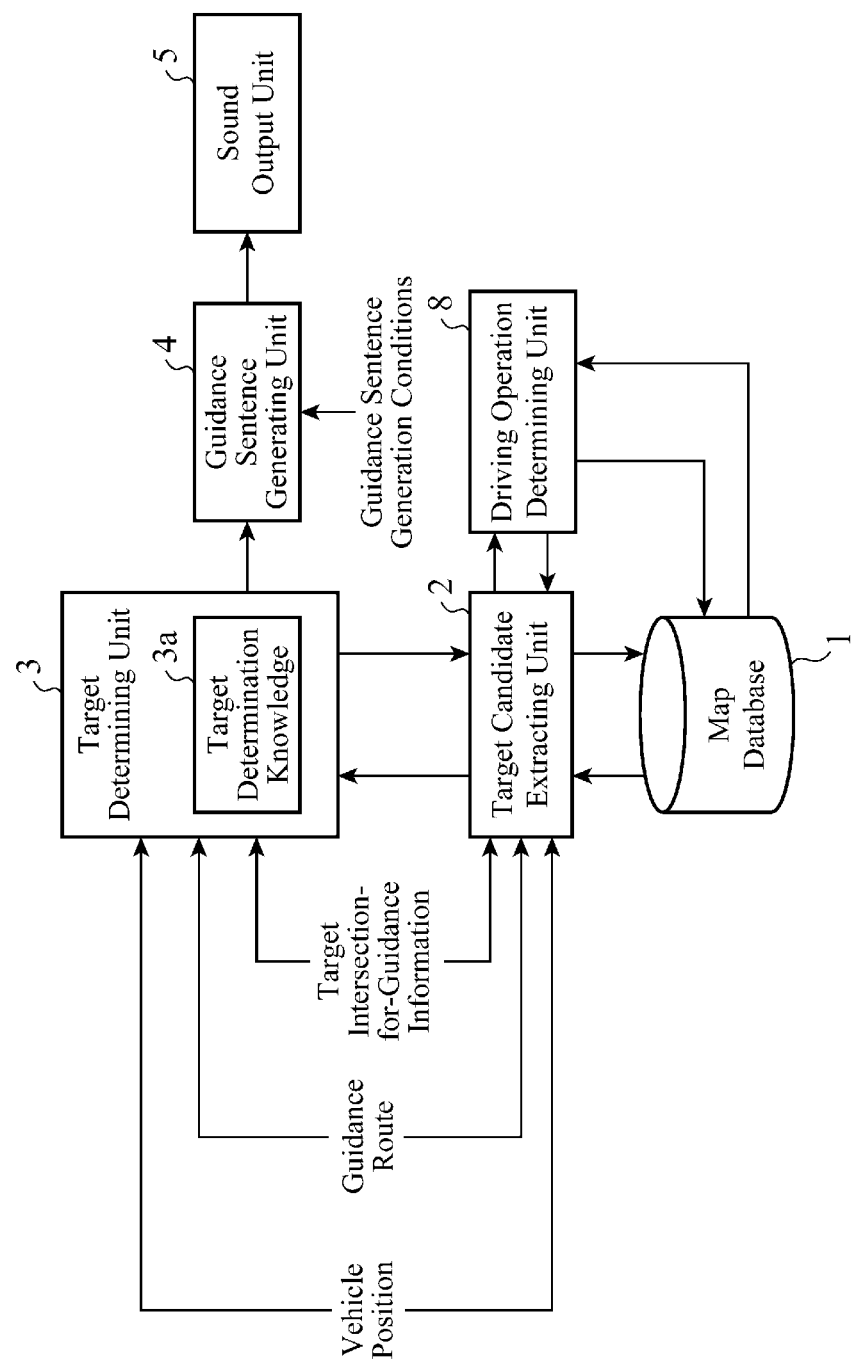
FIG. 14 is a block diagram showing the structure of a main part of a navigation device in accordance with Embodiment 4.

FIG. 14 is a block diagram showing the structure of a main part of a navigation device in accordance with Embodiment 4 of the present invention. In the navigation device, a driving operation determining unit 8 is disposed and is connected to a map database 1 and a target candidate extracting unit 2. Because the other structural components of the navigation device are the same as those according to Embodiment 1 shown in FIG. 1, the same components are designated by the same reference numerals as those shown in FIG. 1, and a duplicate explanation of the components will be omitted hereafter.

Figure 15:
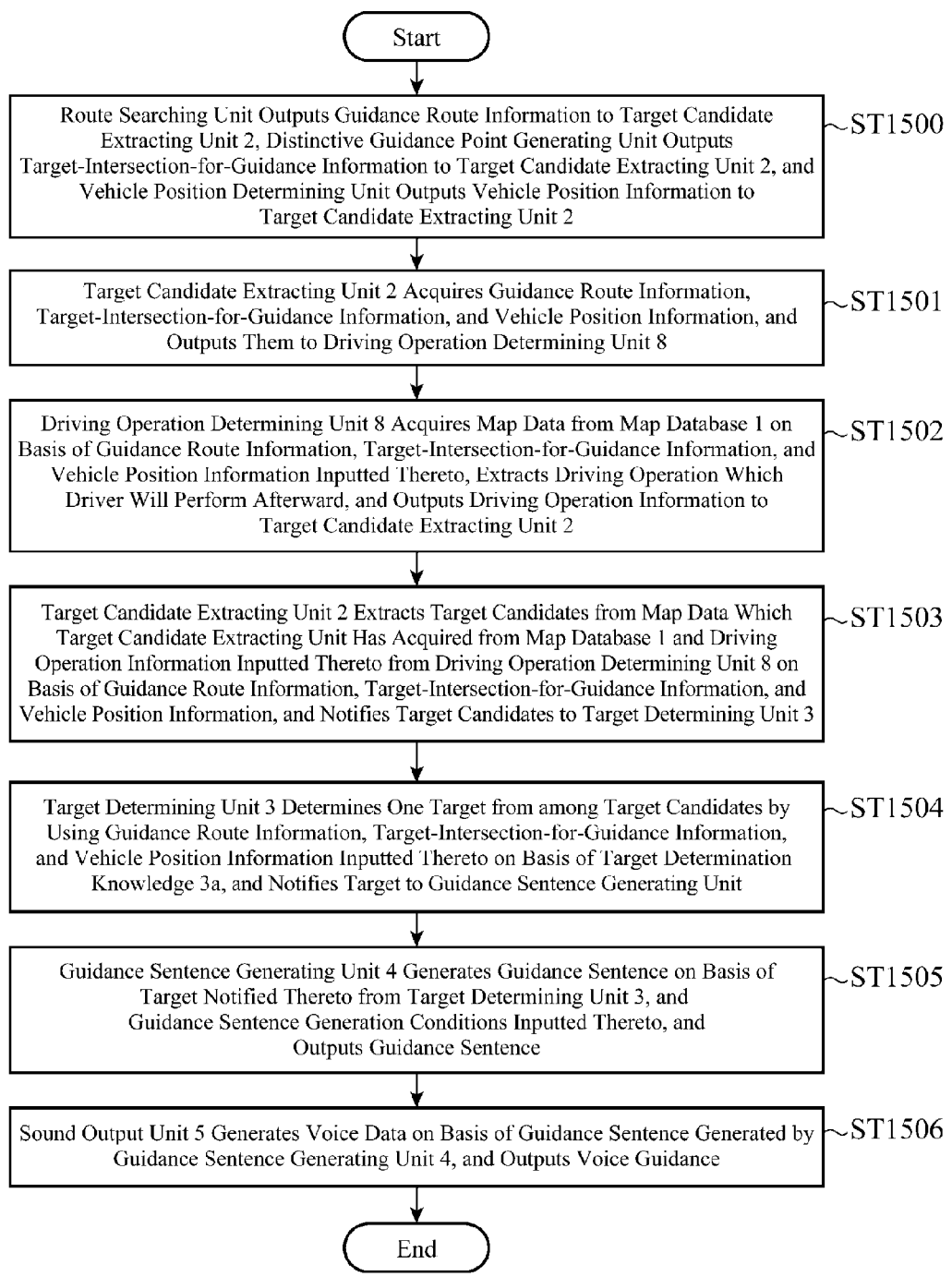
FIG. 15 is a flow chart explaining the operation of the navigation device in accordance with Embodiment 4.

Operation steps according to this Embodiment 4 are shown in FIG. 15. Although these steps are nearly the same as the operation steps according to Embodiment 2 shown in FIG. 7, steps ST1501, ST1502, and ST1503 differ from those according to Embodiment 2. In this Embodiment 4, the target candidate extracting unit 2, in step ST1501, outputs guidance route information, target-intersection-for-guidance information, and vehicle position information to the driving operation determining unit 8. The driving operation determining unit 8, in step ST1502, acquires map data which the navigation device has acquired from the map database 1 on the basis of the guidance route information, the target-intersection-for-guidance information, and the vehicle position information which are inputted thereto, determines a driving operation which the driver will perform while traveling along the route, and notifies the driving operation to the target candidate extracting unit 2. The target candidate extracting unit 2, in step ST1503, extracts target candidates from the map data which the target candidate extracting unit has acquired from the map database 1, and the driving operation notified thereto from the driving operation determining unit 8 on the basis of the guidance route information, the target-intersection-for-guidance information, and the vehicle position information, and notifies the target candidates to a target determining unit.

As mentioned above, the navigation device according to Embodiment 4 is characterized in that the driving operation determining unit 8 also determines whether there exists a driving operation (e.g. an operation such as a stop I), which is not stored directly in the map database 1, and, when determining that there exists a driving operation, notifies the driving operation to the target candidate extracting unit, so that this driving operation can be used as a target candidate. As a result, the navigation device can provide information about a driving operation which does not exist in the map database 1 and a positional relationship between the point where the driver will perform the driving operation and the target intersection for guidance for the driver.

Figure 16:
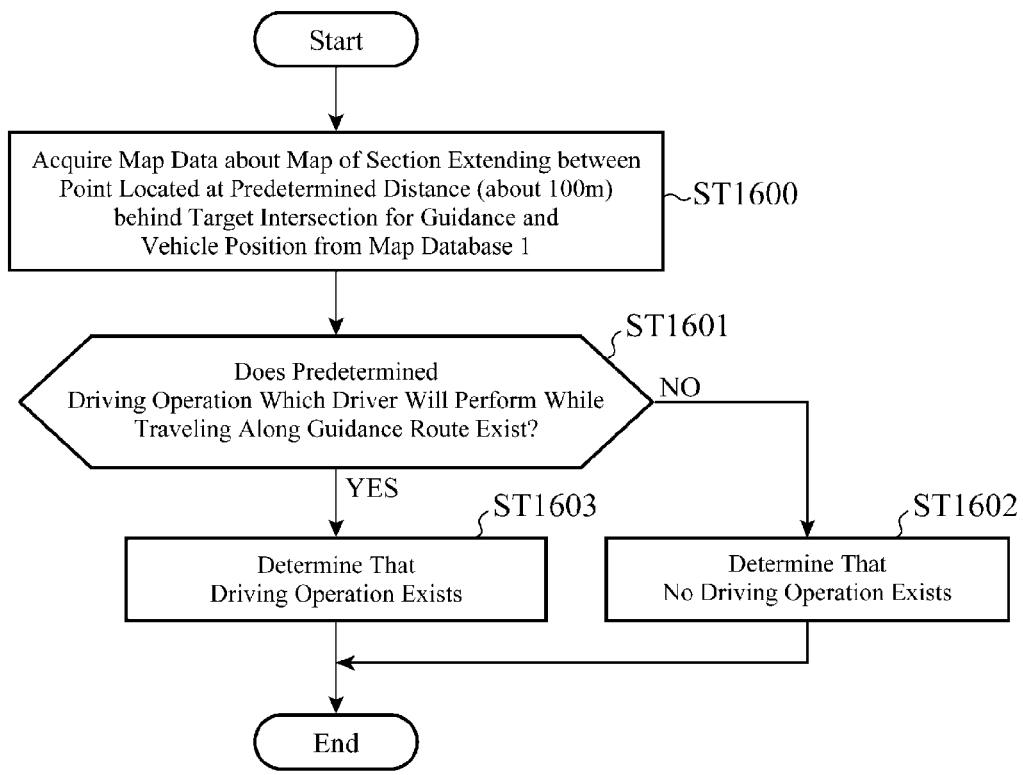
FIG. 16 is a flow chart explaining the operation of a driving operation determining unit.

An example of this operation of the driving operation determining unit 8 will be explained with reference to FIG. 16. When the driving operation determining unit starts its operation, the driving operation determining unit receives the information about the guidance route which is searched for by a not-shown route searching unit, the target-intersection-for-guidance information (various pieces of information about the positions of intersections and so on) which is generated by a not-shown distinctive guidance point generating unit, and the information about the vehicle position which is determined by a not-shown vehicle position determining unit, acquires the map data about a map of a section extending between a point located at a predetermined distance (about 100 m) behind a target intersection for guidance and the vehicle position from the map database 1 (step ST1600). The driving operation determining unit then determines whether there exists a predetermined driving operation (e.g. an operation such as a stop I) which the driver will perform when traveling along the guidance route on the basis of the acquired information (step ST1601).

When the result of the determination in above-mentioned step ST1601 shows NO, the driving operation determining unit shifts to step ST1602 and determines that no driving operation exists along the route. In contrast, when the result of the determination in above-mentioned step ST1601 shows YES, the driving operation determining unit shifts to step ST1603 and determines that a driving operation exists along the route, and ends the operation.

Figure 17:
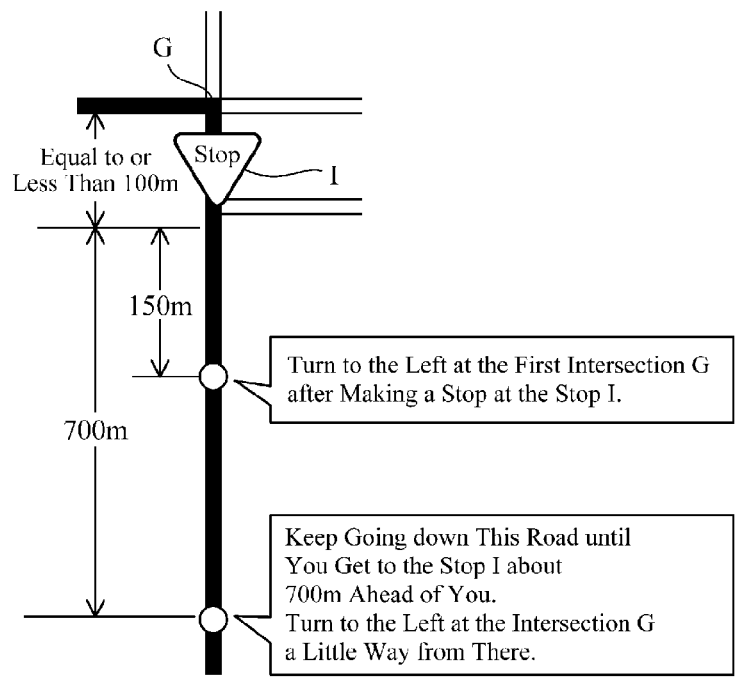
FIG. 17 is a view showing an example of guidance provided by the navigation device in accordance with Embodiment 4.

When determining in the above-mentioned determination operation that a driving operation exists along the route, the driving operation determining unit notifies all driving operations to the target candidate extracting unit 2. The target candidate extracting unit 2 extracts target candidates from the map data which the target candidate extracting unit has acquired from the map database 1, and the driving operations notified thereto from the driving operation determining unit on the basis of the guidance route information, the target-intersection-for-guidance information, and the vehicle position information, and notifies the target candidates to a target determining unit 3. The target determining unit 3 determines one target from among the target candidates notified thereto by using the guidance route information, the target-intersection-for-guidance information, and the vehicle position information, which are inputted thereto, on the basis of knowledge 3a about target determination, and notifies the target determined thereby to a guidance sentence generating unit. The guidance sentence generating unit 4 generates a guidance sentence on the basis of the target notified thereto from the target determining unit 3, and guidance sentence generation conditions inputted thereto from a guidance sentence generation condition generating unit, and outputs the guidance sentence. A sound output unit 5 generates voice data on the basis of the guidance sentence generated by the guidance sentence generating unit 4, and outputs voice guidance. As a result, the navigation device can provide voice guidance including a positional relationship between the driving operation defined as the target and the target intersection for guidance, such as "Turn to the left at the first intersection G after making a stop I" as shown in FIG. 17.

The operation shown above is an example, and the driving operation determining unit 8 can be constructed in such a way as to, in step ST1501 of FIG. 15, receive the information about the guidance route which is searched for by the route searching unit not shown in FIG. 14, the target-intersection-for-guidance information which is generated by the distinctive guidance point generating unit not shown in FIG. 14, and the information about the vehicle position which is determined by the vehicle position determining unit not shown in FIG. 14, instead of acquiring the guidance route information, target-intersection-for-guidance information, and the vehicle position information from the target candidate extracting unit 2.

Further, a driving operation which the driving operation determining unit 8 extracts in step ST1502 of FIG. 15 is not limited to a stop I. Any driving operation, such as a "lane change, or acceleration or slowdown (taking the speed limit imposed on the road into consideration)," can be extracted as a target candidate as long as the driving operation can be determined as a driving operation which the driver will perform on the basis of the guidance route information, the target-intersection-for-guidance information, the vehicle position information, the map data, etc. which are acquired. As a result, the navigation device can provide guidance such as "Turn to the right at the first intersection after making a lane change." Further, the second target intersection for guidance existing ahead of the vehicle can be included as a target whose positional relationship is taken into consideration by the target determining unit 3 and the target determination knowledge 3a shown in FIG. 14, and the driving operation determining unit 8 can be constructed in such a way as to extract a "right or left turn" as a driving operation. As a result, the navigation device can provide guidance such as "Turn to the right at the second intersection after making a turn."

Further, the driving operation determining unit 8 can be constructed in such a way as to, in step ST1502 of FIG. 15, acquire data about driving operations from a communication unit not shown in FIG. 14 to extract a driving operation, instead of acquiring map data from the map database 1 to determine whether the map data acquired thereby include information about a driving operation. For example, the driving operation determining unit can acquire traffic jam information from a not-shown communication unit, extract "passage through traffic jam" as a driving operation, and notify this driving operation to the target candidate extracting unit 2. As a result, the navigation device can provide guidance such as "Turn to the right at the first intersection after passing the traffic jam." In addition, the driving operation determining unit 8 can be constructed in such a way as to, in step ST1502, notify the driving operation to the target determining unit 3.

As mentioned above, because the navigation device according to this Embodiment 4 uses, as a target, a driving operation which the driver will perform while traveling along the guidance route for guidance, the navigation device can provide guidance which is easy for the driver to understand. There is provided another advantage of being able to concretely notify a situation of a section extending from the point where the driver will perform the driving operation to the target intersection for guidance, thereby making it easy for the driver to identify the target intersection for guidance. Further, because the navigation device according to this embodiment provides guidance on a series of situations of the section extending up to the target intersection for guidance, there is provided a further advantage of making it easy for the driver to grasp the position where the vehicle is currently traveling. In addition, because the navigation device can use even information which is not stored in the map database 1 as a target, the navigation device can provide voice guidance adapted to various road situations.

Embodiment 5

Figure 18:
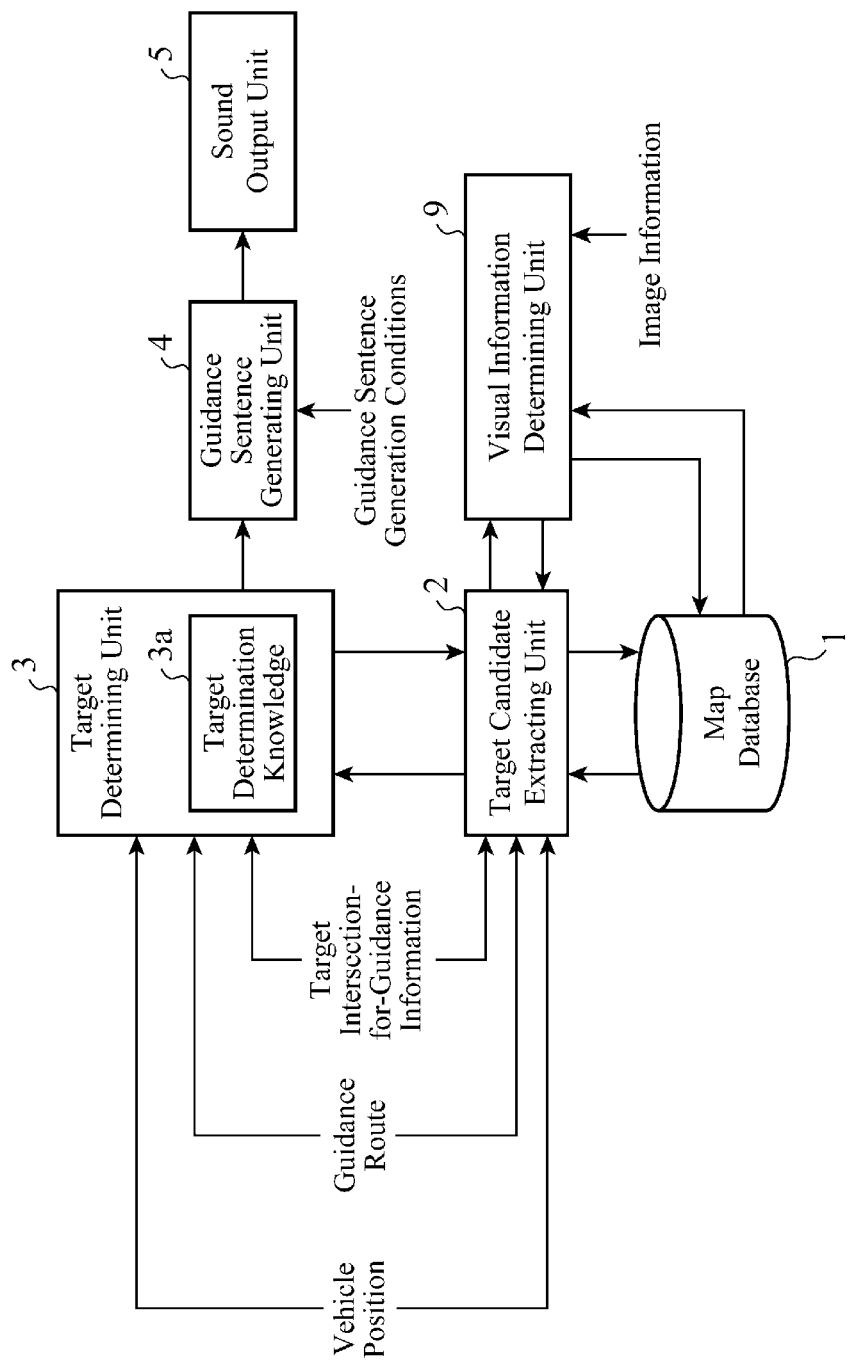
FIG. 18 is a block diagram showing the structure of a main part of a navigation device in accordance with Embodiment 5.

FIG. 18 is a block diagram showing the structure of a main part of a navigation device in accordance with Embodiment 5 of the present invention. In the navigation device, a visual information determining unit 9 is disposed and is connected to a map database 1 and a target candidate extracting unit 2. Because the other structural components of the navigation device are the same as those according to Embodiment 1 shown in FIG. 1, the same components are designated by the same reference numerals as those shown in FIG. 1, and a duplicate explanation of the components will be omitted hereafter.

Figure 19:
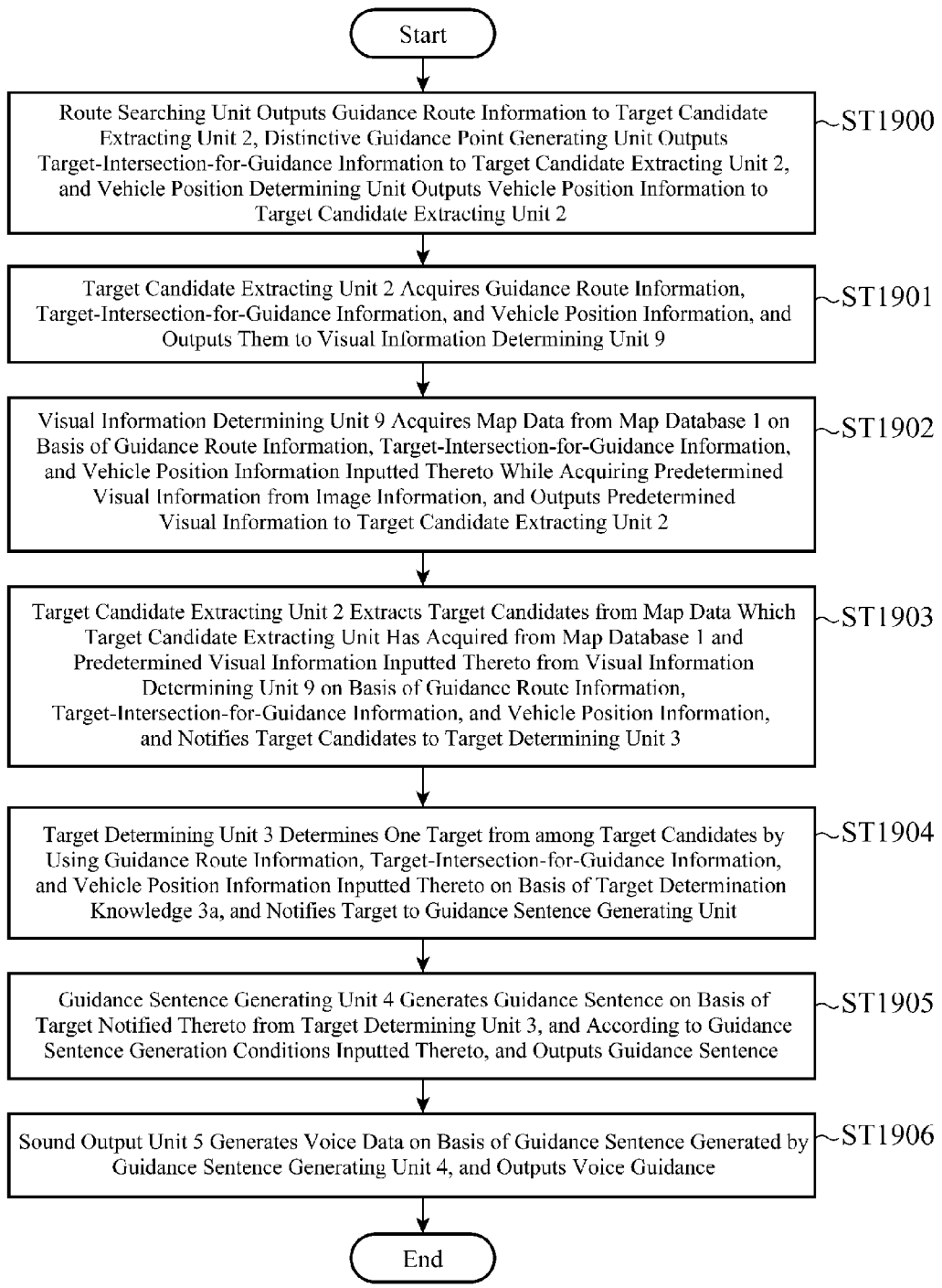
FIG. 19 is a flow chart explaining the operation of the navigation device in accordance with Embodiment 5.

Operation steps according to this Embodiment 5 are shown in FIG. 19. Although these steps are nearly the same as the operation steps according to Embodiment 2 shown in FIG. 7, steps ST1901, ST1902, and ST1903 differ from those according to Embodiment 2. In this Embodiment 5, the target candidate extracting unit 2, in step ST1901, outputs guidance route information, target-intersection-for-guidance information, and vehicle position information to the visual information determining unit 9. The visual information determining unit 9, in step ST1902, acquires map data which the navigation device has acquired from the map database 1 on the basis of the guidance route information, the target-intersection-for-guidance information, and the vehicle position information which are inputted thereto, also acquires image information, such as a camera image, from an image acquiring unit not shown in FIG. 18, determines whether predetermined visual information exists in the image information (e.g. whether or not there is a pedestrian crossing R in the image information), and, when determining that predetermined visual information exists in the image information, outputs the predetermined visual information to the target candidate extracting unit 2. The target candidate extracting unit 2, in step ST1903, extracts target candidates from the map data which the target candidate extracting unit has acquired from the map database 1, and the predetermined visual information inputted thereto from the visual information determining unit 9 on the basis of the guidance route information, the target-intersection-for-guidance information, and the vehicle position information, and notifies the target candidates to a target determining unit.

As mentioned above, the navigation device according to Embodiment 5 is characterized in that the visual information determining unit 9 extracts visual information (e.g. information about whether or not there is a pedestrian crossing R) which is not stored directly in the map database 1, so that this visual information can be used as a target candidate. As a result, the navigation device can provide visual information which does not exist in the map database 1 and a positional relationship between the visual information and the target intersection for guidance for the driver.

Figure 20:
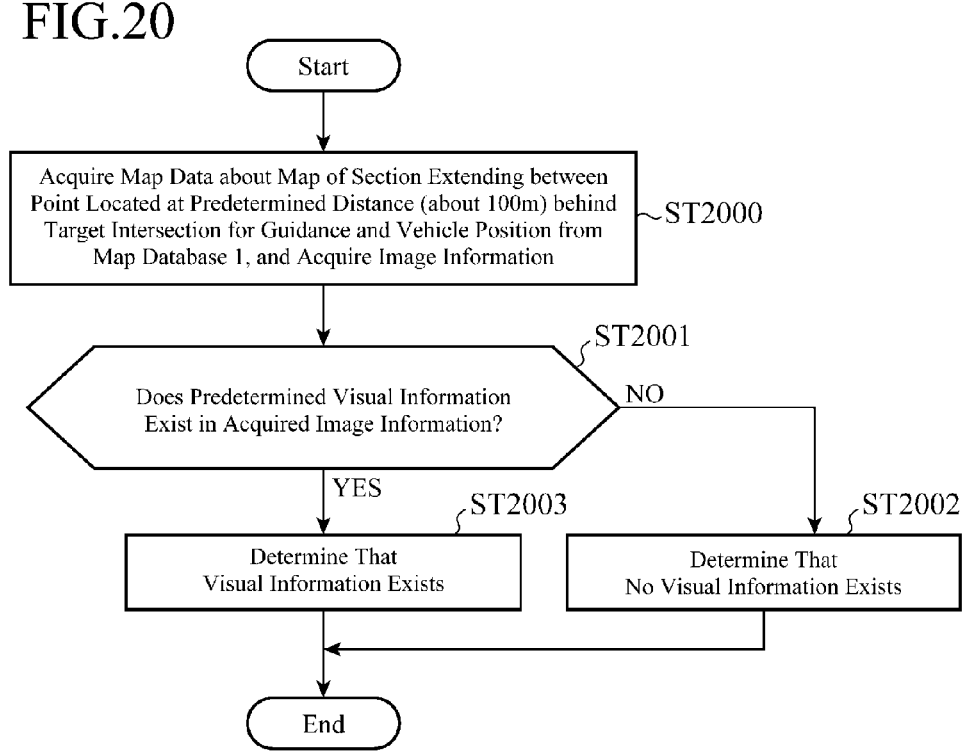
FIG. 20 is a flow chart explaining the operation of a visual information determining unit.
Figure 21:
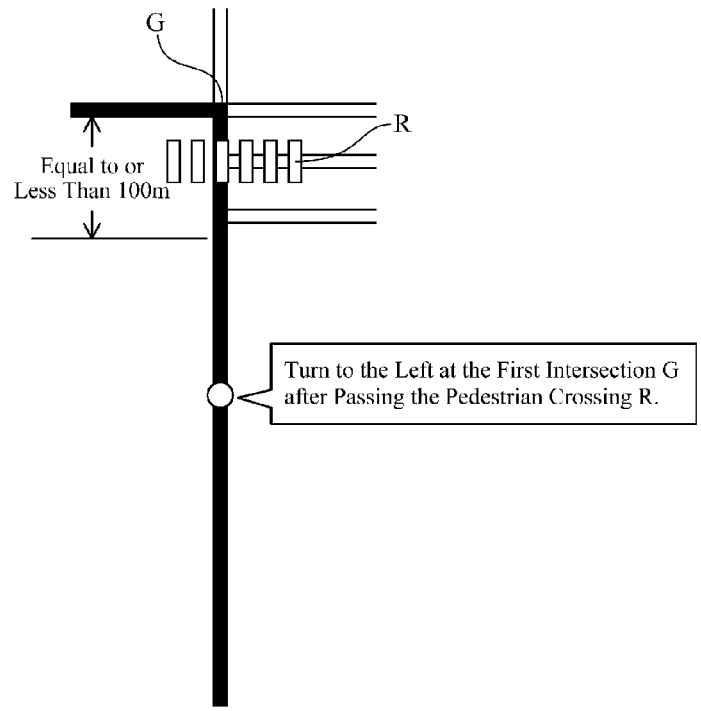
FIG. 21 is a view showing an example of guidance provided by the navigation device in accordance with Embodiment 5.

An example of this operation of the visual information determining unit 9 will be explained with reference to FIG. 20. When the visual information determining unit starts its operation, the visual information determining unit receives the information about the guidance route which is searched for by a not-shown route searching unit, the target-intersection-for-guidance information (various pieces of information about the positions of intersections and so on) which is generated by a not-shown distinctive guidance point generating unit, and the information about the vehicle position which is determined by a not-shown vehicle position determining unit, acquires the map data about a map of a section extending between a point located at a predetermined distance (about 100 m) behind a target intersection for guidance and the vehicle position from the map database 1, and also acquires image information from the not-shown image acquiring unit such as a camera (step ST2000). The visual information determining unit then determines whether or not predetermined visual information is included (e.g. whether or not there is a pedestrian crossing R) in the image information acquired thereby (step ST2001). For example, when a predetermined white line image is included in the image information, the visual information determining unit, in this step ST2001, can refer to both the position information held by the image information and intersection data acquired from the map database 1, and determine that there is a pedestrian crossing. Further, the image acquiring unit is not limited to a camera, and can be a sensor which can acquire image information by using an infrared ray, a millimeter wave, or the like.

When the result of the determination in above-mentioned step ST2001 shows NO, the visual information determining unit shifts to step ST2002 and then determines that no visual information exists along the route, and ends the operation. In contrast, when the result of the determination in above-mentioned step ST2001 shows YES, the visual information determining unit shifts to step ST2003 and then determines that visual information exists along the route, and ends the operation.

When determining in the above-mentioned determination operation that predetermined visual information exists along the route, the visual information determining unit outputs all pieces of visual information to the target candidate extracting unit 2. The target candidate extracting unit 2 extracts target candidates from the map data which the target candidate extracting unit has acquired from the map database 1, and the visual information inputted thereto from the visual information determining unit 9 on the basis of the guidance route information, the target-intersection-for-guidance information, and the vehicle position information, and notifies the target candidates to a target determining unit 3. The target determining unit 3 determines one target from among the target candidates notified thereto by using the guidance route information, the target-intersection-for-guidance information, and the vehicle position information, which are inputted thereto, on the basis of knowledge 3a about target determination, and notifies the target determined thereby to a guidance sentence generating unit. The guidance sentence generating unit 4 generates a guidance sentence on the basis of the target notified thereto from the target determining unit 3, and guidance sentence generation conditions inputted thereto from a guidance sentence generation condition generating unit, and outputs the guidance sentence. A sound output unit 5 generates voice data on the basis of the guidance sentence generated by the guidance sentence generating unit 4, and outputs voice guidance. As a result, the navigation device can provide voice guidance including a positional relationship between the visual information and the target intersection for guidance, such as "Turn to the left at the first intersection G after passing the pedestrian crossing R" as shown in FIG. 17.

The operation shown above is an example, and the visual information determining unit 9 can be constructed in such a way as to, in step ST1901 of FIG. 19, receive the information about the guidance route which is searched for by the route searching unit not shown in FIG. 18, the target-intersection-for-guidance information which is generated by the distinctive guidance point generating unit not shown in FIG. 18, and the information about the vehicle position which is determined by the vehicle position determining unit not shown in FIG. 18, instead of acquiring the guidance route information, target-intersection-for-guidance information, and the vehicle position information from the target candidate extracting unit 2.

Further, in step ST1902 of FIG. 19, visual information which is extracted by the visual information determining unit 9 is not limited to information showing "there is a pedestrian crossing R." Information which can be determined from the guidance route information, the target-intersection-for-guidance information, the vehicle position information, the map data, and the image information which are acquired can be visual information. For example, information indicating "a red car is making a turn or a white car is standing still" can be visual information. In such a case, for example, the visual information determining unit can extract a red car from the image information and specify the direction of the red car, refer to both the position information which the image has and the intersection data acquired from the map database 1, and determine that the red car is making a turn. As a result, the navigation device can provide guidance such as "Turn to the left at the first intersection G after passing the place where the red car has made a turn."

Further, the visual information determining unit 9 can be constructed in such a way as to, in step ST1902 of FIG. 19, acquire data related to visual information or visual information itself from a not-shown communication unit and output the visual information, instead of acquiring the image information from the map database 1 or the not-shown image information acquiring unit and then extracting visual information. In addition, the visual information determining unit 9 can be constructed in such a way as to, in step ST1902, output the visual information to the target determining unit 3.

As mentioned above, because the navigation device according to this Embodiment 5 uses, as a target, visual information for guidance while the vehicle travels along the guidance route, the navigation device can provide guidance which is easy for the driver to understand. There is provided another advantage of being able to concretely notify a situation of a section extending from the point associated with the visual information to the target intersection for guidance, thereby making it easy for the driver to identify the target intersection for guidance. Further, because the navigation device according to this embodiment provides guidance on a series of situations of the section extending up to the target intersection for guidance, there is provided a further advantage of making it easy for the driver to grasp the position where the vehicle is currently traveling. In addition, because the navigation device can use even information which is not stored in the map database 1 as a target, the navigation device can provide voice guidance adapted to various road situations.

INDUSTRIAL APPLICABILITY

As mentioned above, because the navigation device in accordance with the present invention is constructed in such a way as to use a target to concretely notify a situation of a section extending from the target to a target intersection for guidance, thereby making it easy for the driver to identify the target intersection for guidance, the navigation device is suitable for use as a navigation device and so on which provide route guidance for the driver by voice.

EXPLANATIONS OF REFERENCE NUMERALS

1 map database, 2 target candidate extracting unit, 3 target determining unit, 4 guidance sentence generating unit, 5 sound output unit, 6 structure determining unit, 7 distinctive road determining unit, 8 driving operation determining unit, 9 visual information determining unit.

The invention claimed is:

1. A navigation device comprising:
   a target candidate extracting unit for extracting a plurality of target candidates located along a guidance route from a map database on a basis of a vehicle position, the guidance route, and intersection information about a target intersection for guidance, wherein each of the extracted target candidates is a guidance target which solely exists, for each type of targets, alongside the guidance route in a section extending from the vehicle position to a point located at a predetermined distance from the target intersection for guidance;
   a target determining unit for determining whether or not each of said target candidates extracted by said target candidate extracting unit should be used as a target on a basis of a positional relationship between said each of the target candidates and the target intersection for guidance;
   a guidance sentence generating unit for generating a guidance sentence by using said target determined by said target determining unit; and
   a sound output unit for outputting voice guidance on a basis of said guidance sentence generated by said guidance sentence generating unit.

2. The navigation device according to claim 1, wherein said target determining unit determines said target on a basis of said intersection information about the target intersection for guidance, information about a section extending from said target intersection for guidance to each of the target candidates, or an order of priorities respectively assigned to the target candidates.

3. The navigation device according to claim 1, wherein said target determining unit determines said target on a basis of whether said target intersection for guidance has a traffic signal, whether or not said target intersection for guidance is a highway entrance, a distance between said target intersection for guidance and each of the target candidates, a number of intersections existing between said target intersection for guidance and each of the target candidates, or an order of priorities respectively assigned to the target candidates.

4. The navigation device according to claim 1, wherein said navigation device includes a structure determining unit for acquiring map data from said map database on a basis of said vehicle position, said guidance route, and said intersection information about the target intersection for guidance, and for determining whether or not said map data is information about a predetermined structure, and said target determining unit determines the predetermined structure as a target candidate.

5. The navigation device according to claim 1, wherein said navigation device includes a structure determining unit for acquiring map data from said map database on a basis of said vehicle position, said guidance route, and said intersection information about the target intersection for guidance, and for determining whether or not a road or railroad crossing said guidance route is above said guidance route on a basis of at least one of information about an altitude of the road crossing said guidance route, information about an altitude of the railroad crossing said guidance route, an order in which said road and said guidance route are to be drawn, and an order in which said railroad and said guidance route are to be drawn to determine whether or not said road or railroad is an elevated object, and said target determining unit determines the elevated object as a target candidate.

6. The navigation device according to claim 1, wherein said navigation device includes a distinctive road determining unit for acquiring map data from said map database on a basis of said vehicle position, said guidance route, and said intersection information about the target intersection for guidance, and for determining whether or not a road is a predetermined distinctive road on a basis of a connection angle of said road, a difference in altitude between points on said road, a width of said road, or a number of lanes of said road, and said target determining unit determines the predetermined distinctive road as a target candidate.

7. The navigation device according to claim 1, wherein said navigation device includes a driving operation determining unit for acquiring map data from said map database on a basis of said vehicle position, said guidance route, and said intersection information about the target intersection for guidance, and for determining whether a predetermined driving operation will occur on a basis of information about traffic restrictions on a road, and said target determining unit determines the predetermined driving operation as a target candidate.

8. The navigation device according to claim 1, wherein said navigation device includes a visual information determining unit for determining whether predetermined visual information exists on a basis of said vehicle position, said guidance route, and said intersection information about the target intersection for guidance, and said target determining unit determines the predetermined visual information as a target candidate.

9. The navigation device according to claim 4, wherein said navigation device includes a communication unit for receiving structure information from outside said navigation device, and said structure determining unit determines whether or not said structure information received by said communication unit is information about a predetermined structure on a basis of said structure information.

10. The navigation device according to claim 6, wherein said navigation device includes a communication unit for receiving distinctive road information from outside said navigation device, and said distinctive road determining unit determines whether or not said distinctive road information received by said communication unit is information about a predetermined distinctive road on a basis of said distinctive road information.

11. The navigation device according to claim 7, wherein said navigation device includes a communication unit for receiving driving operation information from outside said navigation device, and said driving operation determining unit determines whether or not said driving operation information received by said communication unit is information about a predetermined driving operation on a basis of said driving operation information.

12. The navigation device according to claim 8, wherein said navigation device includes a communication unit for receiving receives visual information from outside said navigation device, and said visual information determining unit determines whether or not said visual information received by said communication unit is predetermined visual information on a basis of said visual information.

* * * * *